(12) United States Patent
Nishino

(10) Patent No.: US 11,820,106 B2
(45) Date of Patent: Nov. 21, 2023

(54) INTERMEDIATE FILM FOR LAMINATED GLASS AND LAMINATED GLASS

(71) Applicant: SEKISUI CHEMICAL CO., LTD., Osaka (JP)

(72) Inventor: Hiromitsu Nishino, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 116 days.

(21) Appl. No.: 17/282,566

(22) PCT Filed: Oct. 9, 2019

(86) PCT No.: PCT/JP2019/039794
§ 371 (c)(1),
(2) Date: Apr. 2, 2021

(87) PCT Pub. No.: WO2020/075747
PCT Pub. Date: Apr. 16, 2020

(65) Prior Publication Data
US 2021/0339505 A1 Nov. 4, 2021

(30) Foreign Application Priority Data
Oct. 9, 2018 (JP) ................................. 2018-191006

(51) Int. Cl.
*B32B 17/10* (2006.01)
*B32B 3/26* (2006.01)
(Continued)

(52) U.S. Cl.
CPC ........ *B32B 17/10568* (2013.01); *B32B 3/263* (2013.01); *B32B 17/10* (2013.01);
(Continued)

(58) Field of Classification Search
CPC .... B32B 3/02; B32B 3/08; B32B 3/18; B32B 3/263; B32B 17/10; B32B 17/10036;
(Continued)

(56) References Cited

U.S. PATENT DOCUMENTS

2013/0149503 A1 6/2013 Yamamoto et al.
2016/0168353 A1* 6/2016 Spangler ........... B32B 17/10568
428/156
(Continued)

FOREIGN PATENT DOCUMENTS

CN 103080037 5/2013
CN 108025969 5/2018
(Continued)

OTHER PUBLICATIONS

International Preliminary Report on Patentability dated Apr. 8, 2021 in International (PCT) Patent Application No. PCT/JP2019/039794.
(Continued)

*Primary Examiner* — Megha M Gaitonde
(74) *Attorney, Agent, or Firm* — Wenderoth, Lind & Ponack, L.L.P.

(57) ABSTRACT

Provided is an interlayer film for laminated glass with which double images in laminated glass can be significantly suppressed. The interlayer film for laminated glass according to the present invention is an interlayer film for use in a laminated glass that is a head-up display, the interlayer film has one end, and the other end being at the opposite side of the one end, the other end has a thickness larger than a thickness of the one end, the interlayer film has a region for display corresponding to a display region of the head-up display, and when three regions obtained by equally dividing the region for display into three in a direction connecting the one end and the other end are named a first partial region for display, a second partial region for display, and a third partial
(Continued)

region for display in sequence from the one end side, as to partial wedge angle $A_x$, $B_x$, and $C_x$ in the first, second, and third partial regions for display, and partial wedge angle $\varphi_x$ in the region for display satisfy, $|A_x-\varphi_x|$ is 0.05 mrad or less, $|B_x-\varphi_x|$ is 0.05 mrad or less, and $|C_x-\varphi_x|$ is 0.05 mrad or less.

11 Claims, 9 Drawing Sheets

(51) Int. Cl.
  *G02B 27/01*   (2006.01)
  *B32B 3/02*    (2006.01)
  *B32B 3/08*    (2006.01)
  *B32B 3/18*    (2006.01)

(52) U.S. Cl.
  CPC .. *B32B 17/10036* (2013.01); *B32B 17/10605* (2013.01); *B32B 17/10761* (2013.01); *G02B 27/0101* (2013.01); *B32B 3/02* (2013.01); *B32B 3/08* (2013.01); *B32B 3/18* (2013.01); *B32B 2457/20* (2013.01); *Y10T 428/24479* (2015.01)

(58) Field of Classification Search
  CPC ........ B32B 17/10568; B32B 17/10605; B32B 17/10761; B32B 2457/20; G02B 27/0101; Y10T 428/24479; Y10T 428/24612; Y10T 428/24942; Y10T 428/2495; Y10T 428/24959

USPC .......................... 428/156, 172, 212, 213, 214
See application file for complete search history.

(56) References Cited

U.S. PATENT DOCUMENTS

| 2017/0003503 | A1  | 1/2017 | Arndt et al. |
| 2017/0106633 | A1* | 4/2017 | Lu ........................... B32B 27/42 |
| 2018/0272661 | A1  | 9/2018 | Nishino et al. |
| 2019/0143649 | A1  | 5/2019 | Oota |
| 2020/0016872 | A1  | 1/2020 | Oota et al. |

FOREIGN PATENT DOCUMENTS

| CN | 108137403 | 6/2018 |
| JP | 4-502525 | 5/1992 |
| JP | 2017-502124 | 1/2017 |
| JP | 2017-105665 | 6/2017 |
| WO | 91/06031 | 5/1991 |
| WO | 2018/181689 | 10/2018 |

OTHER PUBLICATIONS

Extended European Search Report dated May 31, 2022 in corresponding European Patent Application No. 19870220.1.
Database WPI Week 201742, Thomson Scientific, London, GB; AN 2017-39918W & JP 2017 105665 A (AGC KK), Jun. 15, 2017.
International Search Report dated Jan. 7, 2020 in International (PCT) Application No. PCT/JP2019/039794.

* cited by examiner

[FIG. 1]
(a)
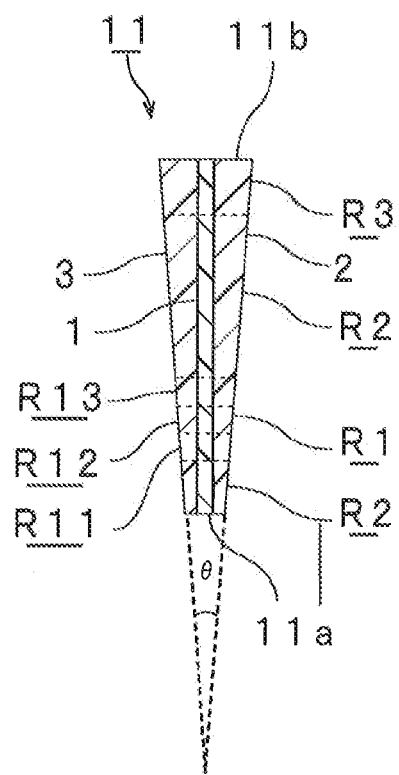
(b)
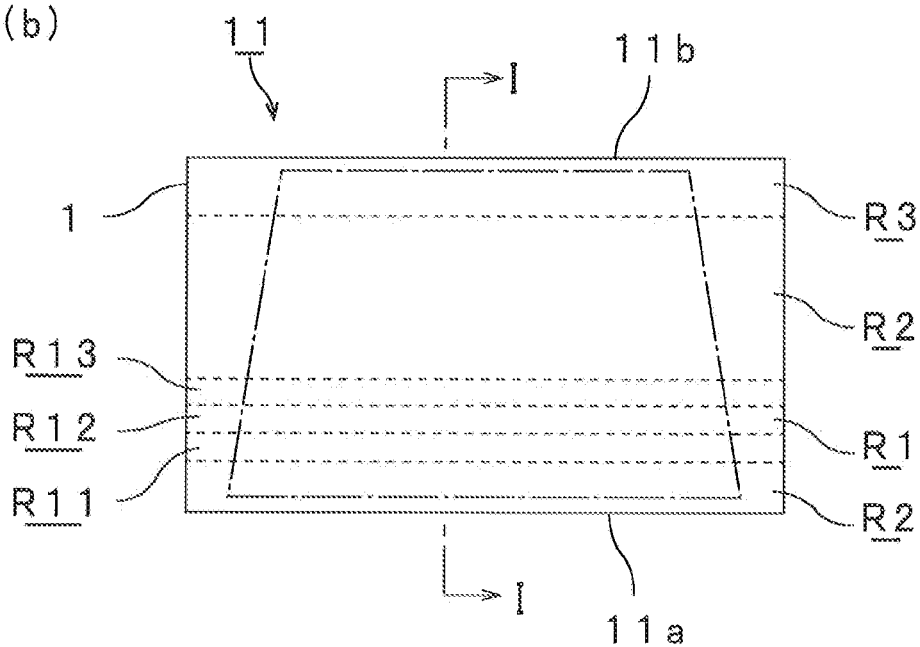

[FIG. 2]
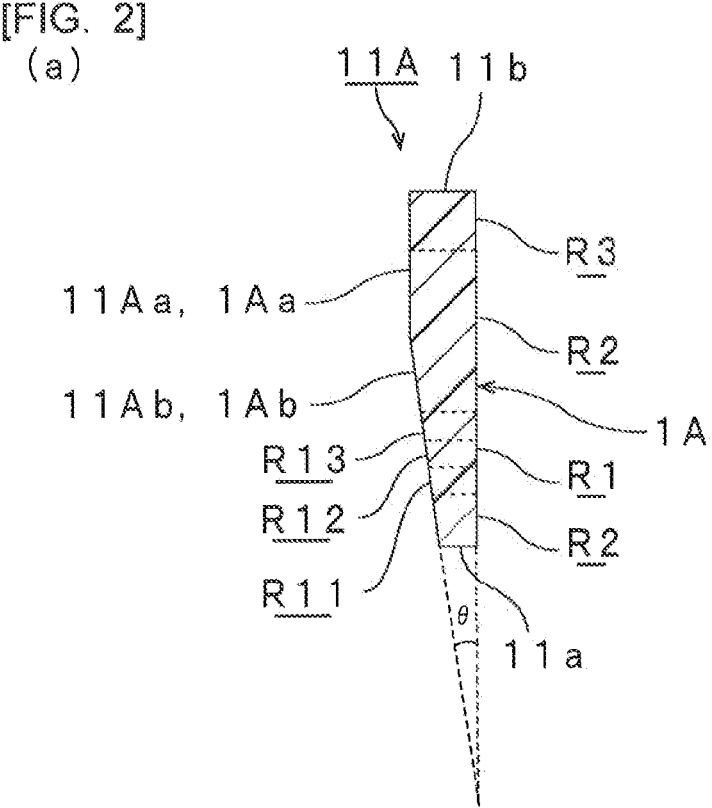
(a)
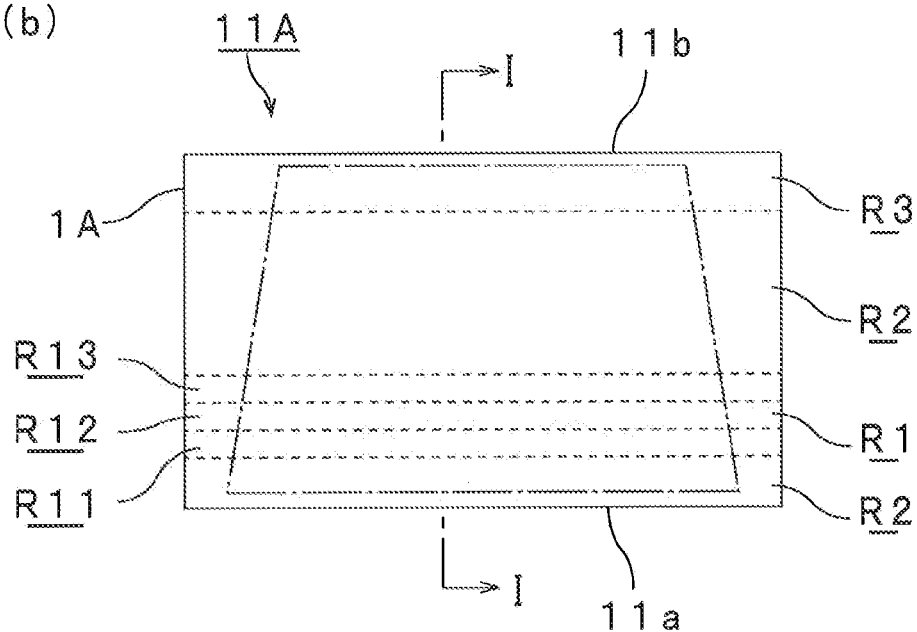
(b)

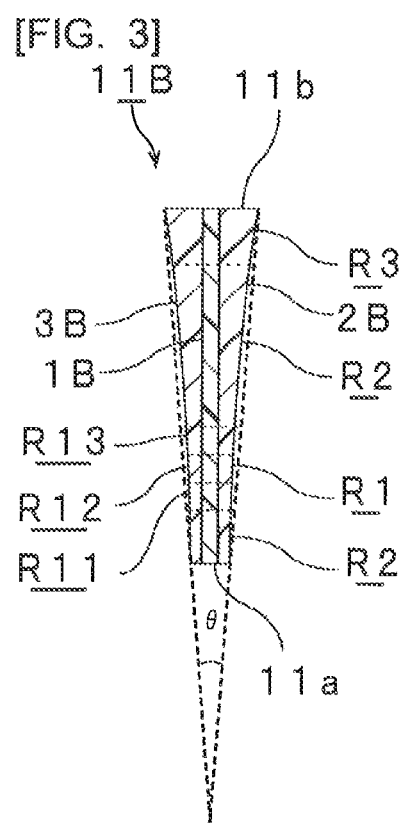
[FIG. 3]

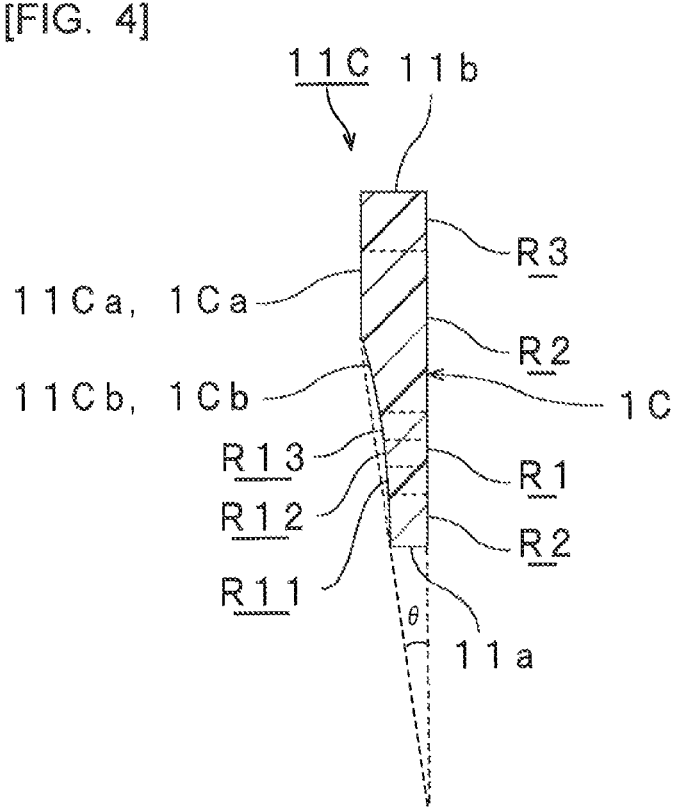
[FIG. 4]

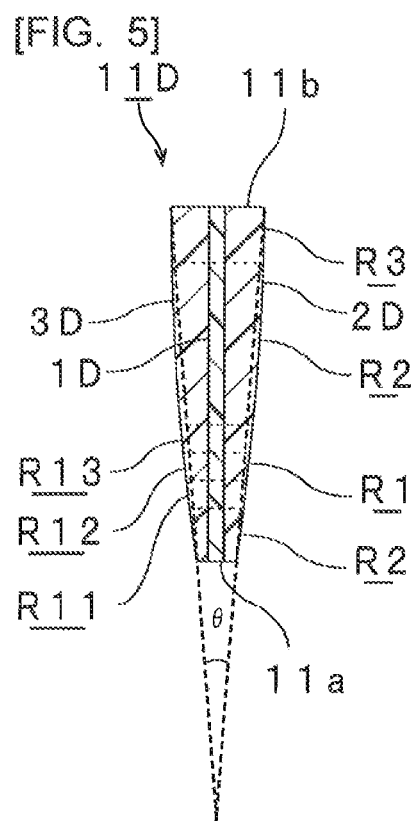

[FIG. 6]
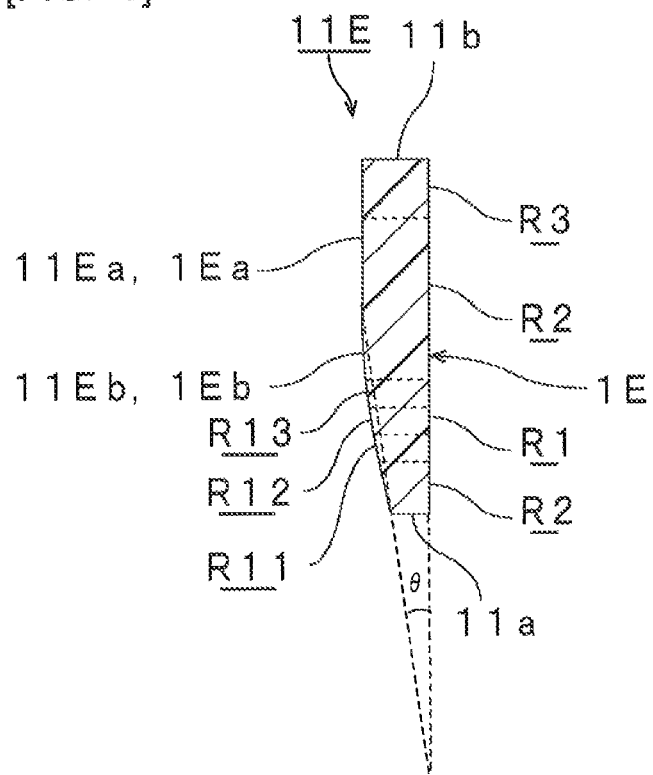

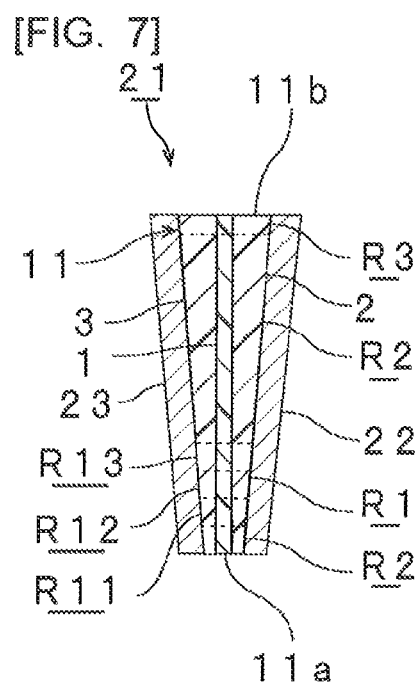

[FIG. 8]
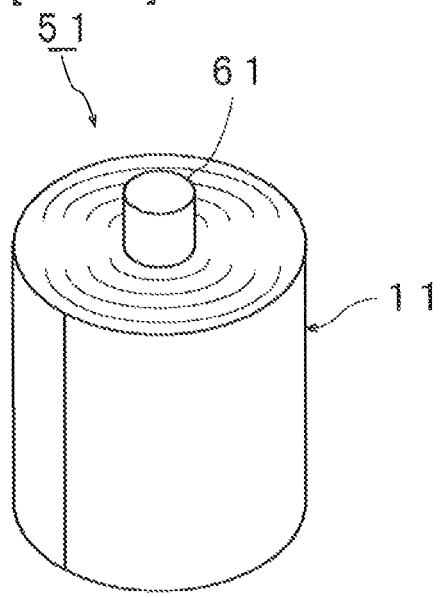
[FIG. 9]
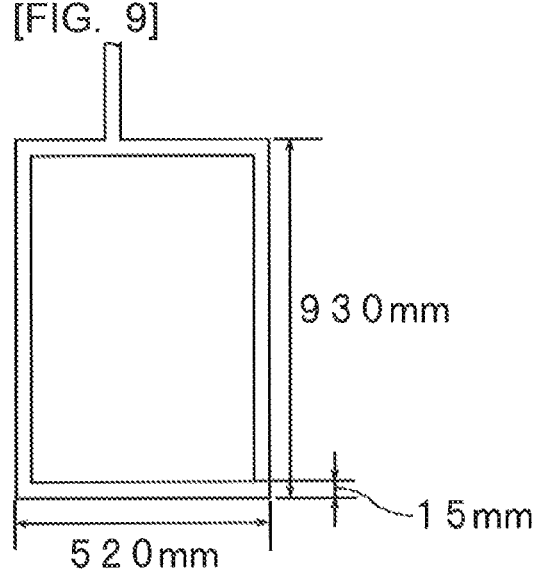

[FIG. 10]
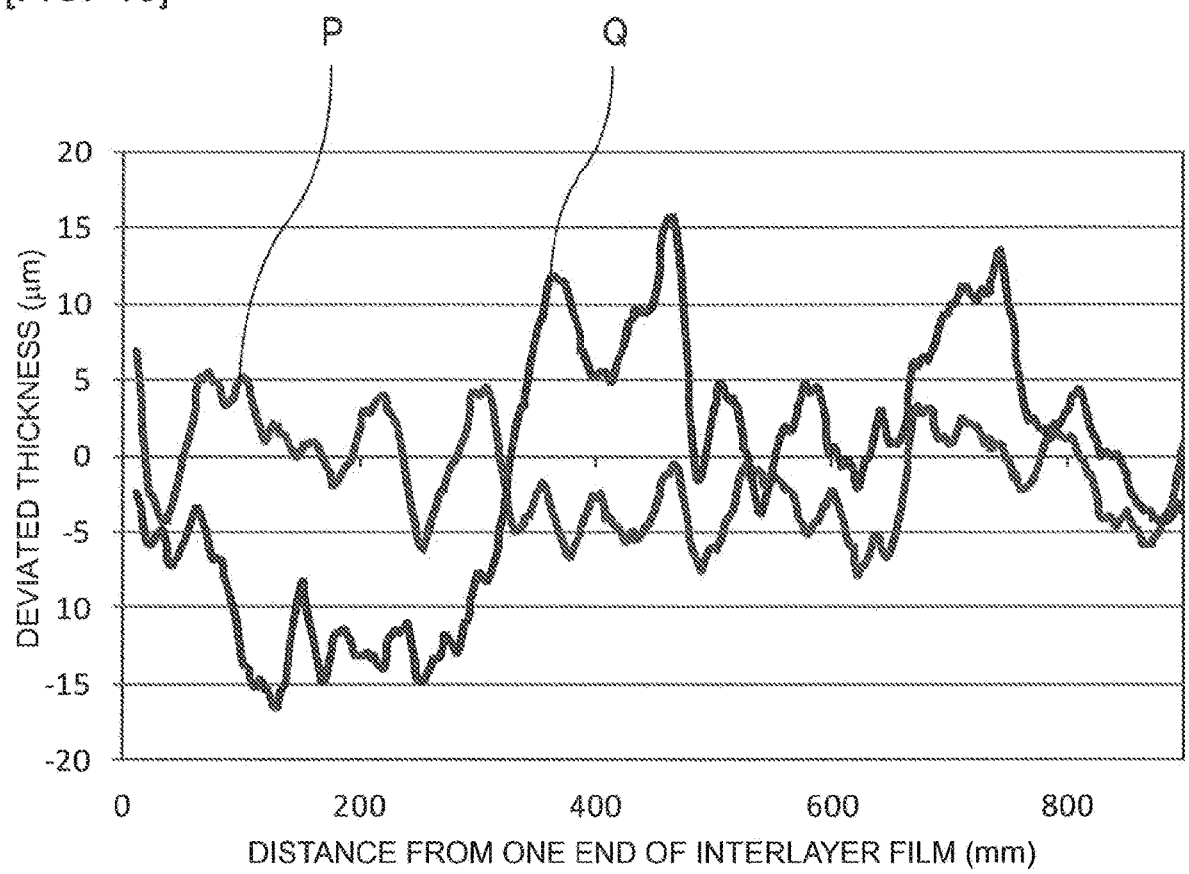

INTERMEDIATE FILM FOR LAMINATED GLASS AND LAMINATED GLASS

TECHNICAL FIELD

The present invention relates to an interlayer film for laminated glass which is used for obtaining laminated glass. Moreover, the present invention relates to a laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates.

Moreover, as the laminated glass used for automobiles, a head-up display (HUD) has been known. In a HUD, it is possible to display measured information including automobile traveling data such as speed on the windshield of the automobile, and the driver can recognize as if the display were shown in front of the windshield.

In the HUD, there is a problem that the measured information or the like is doubly observed.

In order to suppress double images, a wedge-like shaped interlayer film has been used. The following Patent Document 1 discloses a sheet of laminated glass in which a wedge-like shaped interlayer film having a prescribed wedge angle is sandwiched between a pair of glass plates. In such a laminated glass, by the adjustment of the wedge angle of the interlayer film, a display of measured information reflected by one glass plate and a display of measured information reflected by another glass plate can be focused into one point to make an image in the visual field of a driver. As such, the display of measured information is hard to be observed doubly and the visibility of a driver is hardly hindered.

RELATED ART DOCUMENT

Patent Document

Patent Document 1: JP H4-502525 T

SUMMARY OF THE INVENTION

Problems to be Solved by the Invention

In conventional interlayer films, it is difficult to sufficiently suppress double images. Investigation carried out by the present inventors led to the finding that only controlling a wedge angle cannot sufficiently suppress double images.

The present invention is aimed at providing an interlayer film for laminated glass capable of significantly suppressing double images in the laminated glass. Moreover, the present invention is also aimed at providing laminated glass prepared with the above-mentioned interlayer film for laminated glass.

Means for Solving the Problems

According to a broad aspect of the present invention, there is provided an interlayer film for laminated glass (in this specification, "interlayer film for laminated glass" is sometimes abbreviated as "interlayer film") for use in a laminated glass that is a head-up display, the interlayer film having one end, and the other end being at the opposite side of the one end, the other end having a thickness larger than a thickness of the one end, the interlayer film having a region for display corresponding to a display region of the head-up display, when three regions obtained by equally dividing the region for display into three in a direction connecting the one end and the other end are named a first partial region for display, a second partial region for display, and a third partial region for display in sequence from the one end side, an absolute value of difference between partial wedge angle $A_x$ in the first partial region for display, and partial wedge angle $\varphi_x$ in the region for display being 0.05 mrad or less, an absolute value of difference between partial wedge angle $B_x$ in the second partial region for display and partial wedge angle $\varphi_x$ in the region for display being 0.05 mrad or less, an absolute value of difference between partial wedge angle $C_x$ in the third partial region for display and partial wedge angle $\varphi_x$ in the region for display being 0.05 mrad or less.

According to a broad aspect of the present invention, there is provided an interlayer film for laminated glass (in this specification, "interlayer film for laminated glass" is sometimes abbreviated as "interlayer film") having one end, and the other end being at the opposite side of the one end, the other end having a thickness larger than a thickness of the one end, when a region between a position of 10 cm and a position of 59.5 cm from the one end toward the other end of the interlayer film is named a region R, a region between a position of 10 cm and a position of 26.5 cm from the one end toward the other end of the interlayer film is named a first partial region, a region between a position of 26.5 cm and a position of 43 cm from the one end toward the other end of the interlayer film is named a second partial region, and a region between a position of 43 cm and a position of 59.5 cm from the one end toward the other end of the interlayer film is named a third partial region, an absolute value of difference between partial wedge angle $A_y$ in the first partial region and partial wedge angle $\varphi_y$ in the region R being 0.05 mrad or less, an absolute value of difference between partial wedge angle $B_y$ in the second partial region and partial wedge angle $\varphi_y$ in the region R being 0.05 mrad or less, an absolute value of difference between partial wedge angle $C_y$ in the third partial region and partial wedge angle $\varphi_y$ in the region R being 0.05 mrad or less.

In a specific aspect of the interlayer film according to the present invention, the interlayer film as a whole has a wedge angle θ of 0.05 mrad or more.

In a specific aspect of the interlayer film according to the present invention, the interlayer film contains a thermoplastic resin.

In a specific aspect of the interlayer film according to the present invention, the interlayer film contains a plasticizer.

In a specific aspect of the interlayer film according to the present invention, the interlayer film includes a first layer and a second layer arranged on a first surface side of the first layer.

In a specific aspect of the interlayer film according to the present invention, the first layer contains a polyvinyl acetal resin, the second layer contains a polyvinyl acetal resin, and the content of the hydroxyl group of the polyvinyl acetal resin in the first layer is lower than the content of the hydroxyl group of the polyvinyl acetal resin in the second layer.

In a specific aspect of the interlayer film according to the present invention, the first layer contains a polyvinyl acetal resin, the second layer contains a polyvinyl acetal resin, the first layer contains a plasticizer, the second layer contains a plasticizer, and the content of the plasticizer in the first layer relative to 100 parts by weight of the polyvinyl acetal resin in the first layer is larger than the content of the plasticizer in the second layer relative to 100 parts by weight of the polyvinyl acetal resin in the second layer.

According to a broad aspect of the present invention, there is provided a laminated glass that is a head-up display, the laminated glass having one end, and the other end being at the opposite side of the one end, the other end having a thickness larger than a thickness of the one end, the laminated glass having a display region of the head-up display, the laminated glass including: a first lamination glass member, a second lamination glass member, and an interlayer film arranged between the first lamination glass member and the second lamination glass member, the interlayer film having a region for display corresponding to the display region, when three regions obtained by equally dividing the region for display into three in a direction connecting the one end and the other end are named a first partial region for display, a second partial region for display, and a third partial region for display in sequence from the one end side, an absolute value of difference between partial wedge angle $A_x$ of the interlayer film in the first partial region for display, and partial wedge angle $\varphi_x$ of the interlayer film in the region for display being 0.05 mrad or less, an absolute value of difference between partial wedge angle $B_x$ of the interlayer film in the second partial region for display and partial wedge angle $\varphi_x$ of the interlayer film in the region for display being 0.05 mrad or less, an absolute value of difference between partial wedge angle $C_x$ of the interlayer film in the third partial region for display and partial wedge angle $\varphi_x$ of the interlayer film in the region for display being 0.05 mrad or less.

According to a broad aspect of the present invention, there is provided a laminated glass having one end, and the other end being at the opposite side of the one end, the other end having a thickness larger than a thickness of the one end, the laminated glass including: a first lamination glass member, a second lamination glass member, and an interlayer film arranged between the first lamination glass member and the second lamination glass member, when a region between a position of 10 cm and a position of 59.5 cm from the one end toward the other end of the interlayer film is named a region R, a position of 10 cm and a position of 26.5 cm from the one end toward the other end of the interlayer film is named a first partial region, a region between a position of 26.5 cm and a position of 43 cm from the one end toward the other end of the interlayer film is named a second partial region, and a region between a position of 43 cm and a position of 59.5 cm from the one end toward the other end of the interlayer film is named a third partial region, an absolute value of difference between partial wedge angle $A_y$ of the interlayer film in the first partial region and partial wedge angle $\varphi_y$ of the interlayer film in the region R being 0.05 mrad or less, an absolute value of difference between partial wedge angle $B_y$ of the interlayer film in the second partial region and partial wedge angle $\varphi_y$ of the interlayer film in the region R being 0.05 mrad or less, an absolute value of difference between partial wedge angle $C_y$ of the interlayer film in the third partial region and partial wedge angle $\varphi_y$ of the interlayer film in the region R being 0.05 mrad or less.

In a specific aspect of the laminated glass according to the present invention, the interlayer film as a whole has a wedge angle $\theta$ of 0.05 mrad or more.

In a specific aspect of the laminated glass according to the present invention, the first lamination glass member has a wedge angle of 0.05 mrad or more.

In a specific aspect of the laminated glass according to the present invention, the second lamination glass member has a wedge angle of 0.05 mrad or more.

Effect of the Invention

The interlayer film for laminated glass according to the present invention is an interlayer film for laminated glass for use in a laminated glass that is a head-up display. The interlayer film for laminated glass according to the present invention has one end and the other end being at the opposite side of the one end, and the other end has a thickness that is larger than a thickness of the one end. The interlayer film for laminated glass according to the present invention has a region for display corresponding to a display region of a head-up display. In the interlayer film for laminated glass according to the present invention, three regions obtained by equally dividing the region for display into three in a direction connecting the one end and the other end are named a first partial region for display, a second partial region for display, and a third partial region for display in sequence from the one end side. In the interlayer film for laminated glass according to the present invention, an absolute value of difference between partial wedge angle $A_x$ in the first partial region for display, and partial wedge angle $\varphi_x$ in the region for display is 0.05 mrad or less. In the interlayer film for laminated glass according to the present invention, an absolute value of difference between partial wedge angle $B_x$ in the second partial region for display and partial wedge angle $\varphi_x$ in the region for display is 0.05 mrad or less. In the interlayer film for laminated glass according to the present invention, an absolute value of difference between partial wedge angle $C_x$ in the third partial region for display and partial wedge angle $\varphi_x$ in the region for display is 0.05 mrad or less. Since the interlayer film for laminated glass according to the present invention has the above configuration, it is possible to significantly suppress double images in the laminated glass.

The interlayer film for laminated glass according to the present invention has one end and the other end being at the opposite side of the one end, and the other end has a thickness that is larger than a thickness of the one end. In the interlayer film for laminated glass according to the present invention, a region between a position of 10 cm and a position of 59.5 cm from the one end toward the other end of the interlayer film is named a region R. In the interlayer film for laminated glass according to the present invention, a region between a position of 10 cm and a position of 26.5 cm from the one end toward the other end of the interlayer film is named a first partial region. In the interlayer film for laminated glass according to the present invention, a region from the position of 26.5 cm to the position of 43 cm from the one end toward the other end of the interlayer film is named a second partial region. In the interlayer film for laminated glass according to the present invention, a region between a position of 43 cm and a position of 59.5 cm from the one end toward the other end of the interlayer film is named a third partial region. In the interlayer film for laminated glass according to the present invention, an absolute value of difference between partial wedge angle $A_y$ in the first partial region, and partial wedge angle $\varphi_y$ in the region R is 0.05 mrad or less. In the interlayer film for laminated glass according to the present invention, an absolute value of difference between partial wedge angle $B_y$ in the second partial region, and partial wedge angle $\varphi_y$ in the region R is 0.05 mrad or less. In the interlayer film for laminated glass according to the present invention, an absolute value of difference between partial wedge angle $C_y$ in the third partial region, and partial wedge angle $\varphi_y$ in the region R is 0.05 mrad or less. Since the interlayer film for laminated glass according to the present invention has the above configuration, it is possible to significantly suppress double images in the laminated glass.

The laminated glass according to the present invention is a laminated glass that is a head-up display. The laminated glass according to the present invention has one end and the other end being at the opposite side of the one end, and the other end has a thickness that is larger than a thickness of the one end. The laminated glass according to the present invention has a display region of the head-up display. The laminated glass according to the present invention includes a first lamination glass member, a second lamination glass member, and an interlayer film arranged between the first lamination glass member and the second lamination glass member. In the laminated glass according to the present invention, the interlayer film has a region for display corresponding to the display region. In the laminated glass according to the present invention, three regions obtained by equally dividing the region for display into three in a direction connecting the one end and the other end are named a first partial region for display, a second partial region for display, and a third partial region for display in sequence from the one end side. In the laminated glass according to the present invention, an absolute value of difference between partial wedge angle $A_x$ of the interlayer film in the first partial region for display, and partial wedge angle $\varphi_x$ of the interlayer film in the region for display is 0.05 mrad or less. In the laminated glass according to the present invention, an absolute value of difference between partial wedge angle $B_x$ of the interlayer film in the second partial region for display, and partial wedge angle $\varphi_x$ of the interlayer film in the region for display is 0.05 mrad or less. In the laminated glass according to the present invention, an absolute value of difference between partial wedge angle $C_x$ of the interlayer film in the third partial region for display, and partial wedge angle $\varphi_x$ of the interlayer film in the region for display is 0.05 mrad or less. Since the laminated glass according to the present invention is provided with the above-mentioned configurations, it is possible to significantly suppress double images.

The laminated glass according to the present invention has one end and the other end being at the opposite side of the one end, and the other end has a thickness that is larger than a thickness of the one end. The laminated glass according to the present invention includes a first lamination glass member, a second lamination glass member, and an interlayer film arranged between the first lamination glass member and the second lamination glass member. In the laminated glass according to the present invention, a region between a position of 10 cm and a position of 59.5 cm from the one end toward the other end of the interlayer film is named a region R. In the laminated glass according to the present invention, a region between a position of 10 cm and a position of 26.5 cm from the one end toward the other end of the interlayer film is named a first partial region. In the laminated glass according to the present invention, a region between a position of 26.5 cm and a position of 43 cm from the one end toward the other end of the interlayer film is named a second partial region. In the laminated glass according to the present invention, a region between a position of 43 cm and a position of 59.5 cm from the one end toward the other end of the interlayer film is named a third partial region. In the laminated glass according to the present invention, an absolute value of difference between partial wedge angle $A_y$ of the interlayer film in the first partial region, and partial wedge angle $\varphi_y$ of the interlayer film in the region R is 0.05 mrad or less. In the laminated glass according to the present invention, an absolute value of difference between partial wedge angle $B_y$ of the interlayer film in the second partial region, and partial wedge angle $\varphi_y$ of the interlayer film in the region R is 0.05 mrad or less. In the laminated glass according to the present invention, an absolute value of difference between partial wedge angle $C_y$ of the interlayer film in the third partial region, and partial wedge angle $\varphi_y$ of the interlayer film in the region R is 0.05 mrad or less. Since the laminated glass according to the present invention is provided with the above-mentioned configurations, it is possible to significantly suppress double images.

BRIEF DESCRIPTION OF DRAWINGS

FIGS. 1(a) and (b) are a sectional view and a front view, respectively, schematically showing an interlayer film for laminated glass, in accordance with a first embodiment of the present invention.

FIGS. 2(a) and (b) are a sectional view and a front view, respectively, schematically showing an interlayer film for laminated glass, in accordance with a second embodiment of the present invention.

FIG. 3 is a sectional view schematically showing an interlayer film for laminated glass in accordance with a third embodiment of the present invention.

FIG. 4 is a sectional view schematically showing an interlayer film for laminated glass in accordance with a fourth embodiment of the present invention.

FIG. 5 is a sectional view schematically showing an interlayer film for laminated glass in accordance with a fifth embodiment of the present invention.

FIG. 6 is a sectional view schematically showing an interlayer film for laminated glass in accordance with a sixth embodiment of the present invention.

FIG. 7 is a sectional view showing an example of laminated glass prepared with the interlayer film for laminated glass shown in FIG. 1.

FIG. 8 is a perspective view schematically showing a roll body prepared by winding the interlayer film for laminated glass shown in FIG. 1.

FIG. 9 is a figure for explaining a preliminary pressing method used in evaluation of double images in Examples.

FIG. 10 is a figure showing the relationship between the distance from the one end of the interlayer film and the deviated thickness.

MODES FOR CARRYING OUT THE INVENTION

Hereinafter, the details of the present invention will be described.

The interlayer film for laminated glass (in the present specification, sometimes abbreviated as "interlayer film") according to the present invention is used for laminated glass.

The laminated glass according to the present invention includes a first lamination glass member, a second lamination glass member, and an interlayer film arranged between the first lamination glass member and the second lamination glass member.

The interlayer film according to the present invention, and the interlayer film used in the laminated glass according to the present invention have a one-layer structure or a two or more-layer structure. The interlayer film according to the present invention, and the interlayer film used in the laminated glass according to the present invention may have a one-layer structure or may have a two or more-layer structure. The interlayer film according to the present invention, and the interlayer film used in the laminated glass according to the present invention may have a two-layer structure, may have a two or more-layer structure, may have a three-layer structure or may have a three or more-layer structure. The interlayer film according to the present invention, and the interlayer film used in the laminated glass according to the present invention may be a single-layered interlayer film or may be a multi-layered interlayer film.

The interlayer film according to the present invention has one end and the other end being at the opposite side of the one end. The one end and the other end are end parts of both sides facing each other in the interlayer film. In the interlayer film according to the present invention, the thickness of the other end is larger than the thickness of the one end.

The laminated glass according to the present invention has one end and the other end being at the opposite side of the one end. The one end and the other end are end parts of both sides facing each other in the laminated glass. In the laminated glass according to the present invention, the other end has a thickness that is larger than a thickness of the one end.

The one ends of the first lamination glass member, the second lamination glass member and the interlayer film are at the side of the one end of the laminated glass. The other ends of the first lamination glass member, the second lamination glass member and the interlayer film are at the side of the other end of the laminated glass.

The interlayer film according to the present invention is used, for example, in a laminated glass that is a head-up display.

The laminated glass according to the present invention is, for example, a head-up display.

The interlayer film according to the present invention, and the interlayer film used in the laminated glass according to the present invention has, for example, a region for display corresponding to a display region of a head-up display. The region for display is a region capable of favorably displaying information. A preferred range of the region for display will be described later.

In the interlayer film according to the present invention, and the interlayer film in the laminated glass according to the present invention, three regions obtained by equally dividing the region for display into three in a direction connecting the one end and the other end are named a first partial region for display, a second partial region for display, and a third partial region for display in sequence from the one end side. In the region for display, the first partial region for display is located on the one end side. In the region for display, the second partial region for display is located between the first partial region for display and the third partial region for display. In the region for display, the third partial region for display is located on the other end side.

In the interlayer film according to the present invention, and the interlayer film in the laminated glass according to the present invention, the following partial wedge angle $\varphi_x$, partial wedge angle $A_x$, partial wedge angle $B_x$, and partial wedge angle $C_x$ are calculated.

Partial wedge angle $\varphi_x$ is a partial wedge angle in the region for display.

Partial wedge angle $\varphi_x$ is a wedge angle determined from an approximation curve of the variation in thickness from the end part of one end side toward the end part of the other end side in the region for display.

Specifically, partial wedge angle $\varphi_x$ is measured in the order of the following 1 to 3.

1: Points P are selected at intervals of 2 mm starting at the end part of the one end side of the region for display and terminating at the end part of the other end side of the region for display.

2: At each point P, the thickness of the interlayer film is measured.

3: Plotting the distance (unit: mm) from the end part of the one end side of the interlayer film on the x axis, and the thickness (unit: μm) of the interlayer film on the y axis, a primary line is obtained by the least-square method. The interior angle formed by the obtained primary line and the line of y=0 is defined as partial wedge angle $\varphi_x$.

Partial wedge angle $A_x$ is a partial wedge angle in the first partial region for display.

Partial wedge angle $A_x$ is a wedge angle determined from an approximation curve of the variation in thickness from the end part of one end side toward the end part of the other end side in the first partial region for display.

Specifically, partial wedge angle $A_x$ is measured in the order of the following 1 to 3.

1: Points P are selected at intervals of 2 mm starting at the end part of the one end side of the first partial region for display and terminating at the end part of the other end side of the first partial region for display.

2: At each point P, the thickness of the interlayer film is measured.

3: Plotting the distance (unit: mm) from the end part of the one end side of the interlayer film on the x axis, and the thickness (unit: μm) of the interlayer film on the y axis, a primary line is obtained by the least-square method. The interior angle formed by the obtained primary line and the line of y=0 is defined as partial wedge angle $A_x$.

Partial wedge angle $B_x$ is a partial wedge angle in the second partial region for display.

Partial wedge angle $B_x$ is a wedge angle determined from an approximation curve of the variation in thickness from the end part of one end side toward the end part of the other end side in the second partial region for display.

Specifically, partial wedge angle $B_x$ is measured in the order of the following 1 to 3.

1: Points P are selected at intervals of 2 mm starting at the end part of the one end side of the second partial region for display and terminating at the end part of the other end side of the second partial region for display.

2: At each point P, the thickness of the interlayer film is measured.

3: Plotting the distance (unit: mm) from the end part of the one end side of the interlayer film on the x axis, and the thickness (unit: μm) of the interlayer film on the y axis, a primary line is obtained by the least-square method. The interior angle formed by the obtained primary line and the line of y=0 is defined as partial wedge angle $B_x$.

Partial wedge angle $C_x$ is a partial wedge angle in the third partial region for display.

Partial wedge angle $C_x$ is a wedge angle determined from an approximation curve of the variation in thickness from the end part of one end side toward the end part of the other end side in the third partial region for display.

Specifically, partial wedge angle $C_x$ is measured in the order of the following 1 to 3.

1: Points P are selected at intervals of 2 mm starting at the end part of the one end side of the third partial region for display and terminating at the end part of the other end side of the third partial region for display.

2: At each point P, the thickness of the interlayer film is measured.

3: Plotting the distance (unit: mm) from the end part of the one end side of the interlayer film on the x axis, and the thickness (unit: μm) of the interlayer film on the y axis, a primary line is obtained by the least-square method. The interior angle formed by the obtained primary line and the line of y=0 is defined as partial wedge angle $C_x$.

In the above "1:" in measurement of partial wedge angle $\varphi_x$, partial wedge angle $A_x$, partial wedge angle $B_x$, and partial wedge angle $C_x$, points are selected up to the position where selection of points at 2-mm intervals can be made from the one end side toward the other end side (positions of which interval is not less than 2 mm).

In the interlayer film according to the present invention, and the interlayer film in the laminated glass according to the present invention, an absolute value of difference between partial wedge angles $A_x$ and partial wedge angle $\varphi_x$ is 0.05 mrad or less. If the absolute value of difference between partial wedge angle $A_x$ and partial wedge angle $\varphi_x$ is more than 0.05 mrad, double images can be generated.

From the viewpoint of effectively suppressing double images, an absolute value of difference between partial wedge angle $A_x$ and partial wedge angle mx is preferably 0.04 mrad or less, more preferably 0.03 mrad or less. From the viewpoint of effectively suppressing double images, especially from the viewpoint of effectively suppressing double images regardless of the seated height of the observer, an absolute value of difference between partial wedge angle $A_x$ and partial wedge angle ix is preferably more than 0 mrad, more preferably 0.01 mrad or more.

In the interlayer film according to the present invention, and the interlayer film in the laminated glass according to the present invention, an absolute value of difference between partial wedge angles $B_x$ and partial wedge angle $\varphi_x$ is 0.05 mrad or less. If the absolute value of difference between partial wedge angle $B_x$ and partial wedge angle $\varphi_x$ is more than 0.05 mrad, double images can be generated.

From the viewpoint of effectively suppressing double images, an absolute value of difference between partial wedge angle $B_x$ and partial wedge angle $\varphi_x$ is preferably 0.04 mrad or less, more preferably 0.03 mrad or less.

In the interlayer film according to the present invention, and the interlayer film in the laminated glass according to the present invention, an absolute value of difference between partial wedge angles $C_x$ and partial wedge angle $\varphi_x$ is 0.05 mrad or less. If the absolute value of difference between partial wedge angle $C_x$ and partial wedge angle $\varphi_x$ is more than 0.05 mrad, double images can be generated.

From the viewpoint of effectively suppressing double images, an absolute value of difference between partial wedge angle $C_x$ and partial wedge angle $\varphi_x$ is preferably 0.04 mrad or less, more preferably 0.03 mrad or less. From the viewpoint of effectively suppressing double images, especially from the viewpoint of effectively suppressing double images regardless of the seated height of the observer, an absolute value of difference between partial wedge angle $C_x$ and partial wedge angle $\varphi_x$ is preferably more than 0 mrad, more preferably 0.01 mrad or more.

From the viewpoint of suppressing double images more effectively, among three absolute values of difference: an absolute value of difference between partial wedge angle $A_x$ and partial wedge angle $\varphi_x$, an absolute value of difference between partial wedge angle $B_x$ and partial wedge angle $\varphi_x$ and an absolute value of difference between partial wedge angle $C_x$ and partial wedge angle $\varphi_x$, it is preferred that the absolute value of difference between partial wedge angle $B_x$ and partial wedge angle $\varphi_x$ be the smallest.

From the viewpoint of effectively suppressing double images, especially from the viewpoint of effectively suppressing double images regardless of the seated height of the observer, it is preferred that partial wedge angle $A_x$ be larger than partial wedge angle $\varphi_x$.

From the viewpoint of effectively suppressing double images, especially from the viewpoint of effectively suppressing double images regardless of the seated height of the observer, it is preferred that partial wedge angle $C_x$ be smaller than partial wedge angle $\varphi_x$.

From the viewpoint of suppressing double images more effectively, especially from the viewpoint of suppressing double images more effectively regardless of the seated height of the observer, it is preferred that partial wedge angle $A_x$ be larger than partial wedge angle ox, and partial wedge angle $C_x$ be smaller than partial wedge angle $\varphi_x$.

From the viewpoint of effectively suppressing double images, and from the viewpoint of favorably obtaining a laminated glass suited for a vehicle in which the attachment angle of the windshield is large, such as a truck or a bus, the partial wedge angle $\varphi_x$ is preferably 0.8 mrad or more, more preferably 0.9 mrad or more, and is preferably 1.2 mrad or less, more preferably 1.1 mrad or less.

From the viewpoint of effectively suppressing double images, and from the viewpoint of favorably obtaining a laminated glass suited for a vehicle in which the attachment angle of the windshield is small, such as a sports car, the partial wedge angle $\varphi_x$ is preferably 0.2 mrad or more, more preferably 0.3 mrad or more, and is preferably 0.6 mrad or less, more preferably 0.5 mrad or less.

From the viewpoint of effectively suppressing double images, and from the viewpoint of favorably obtaining a laminated glass suited for a vehicle in which the attachment angle of the windshield is large, such as a truck or a bus, the partial wedge angle $A_x$ is preferably 1.0 mrad or more, more preferably 1.1 mrad or more, and is preferably 1.4 mrad or less, more preferably 1.3 mrad or less.

From the viewpoint of effectively suppressing double images, and from the viewpoint of favorably obtaining a laminated glass suited for a vehicle in which the attachment angle of the windshield is small, such as a sports car, the partial wedge angle $A_x$ is preferably 0.4 mrad or more, more preferably 0.5 mrad or more, and is preferably 0.8 mrad or less, more preferably 0.7 mrad or less.

From the viewpoint of effectively suppressing double images, and from the viewpoint of favorably obtaining a laminated glass suited for a vehicle in which the attachment angle of the windshield is large, such as a truck or a bus, the partial wedge angle $B_x$ is preferably 0.8 mrad or more, more preferably 0.9 mrad or more, and is preferably 1.2 mrad or less, more preferably 1.1 mrad or less.

From the viewpoint of effectively suppressing double images, and from the viewpoint of favorably obtaining a laminated glass suited for a vehicle in which the attachment angle of the windshield is small, such as a sports car, the partial wedge angle $B_x$ is preferably 0.2 mrad or more, preferably 0.3 mrad or more, and is preferably 0.6 mrad or less, more preferably 0.5 mrad or less.

From the viewpoint of effectively suppressing double images, and from the viewpoint of favorably obtaining a laminated glass suited for a vehicle in which the attachment angle of the windshield is large, such as a truck or a bus, the partial wedge angle $C_x$ is preferably 0.6 mrad or more, more preferably 0.7 mrad or more, and is preferably 1.0 mrad or less, more preferably 0.9 mrad or less.

From the viewpoint of effectively suppressing double images, and from the viewpoint of favorably obtaining a laminated glass suited for a vehicle in which the attachment angle of the windshield is small, such as a sports car, the partial wedge angle $C_x$ is preferably 0 mrad or more, more preferably 0.1 mrad or more, and is preferably 0.4 mrad or less, more preferably 0.3 mrad or less.

From the viewpoint of effectively suppressing double images, especially from the viewpoint of effectively suppressing double images regardless of the seated height of the observer, it is preferred that partial wedge angle $A_x$ be the largest among the three partial wedge angles of the partial wedge angle $A_x$, partial wedge angle $B_x$, and partial wedge angle $C_x$.

From the viewpoint of effectively suppressing double images, especially from the viewpoint of effectively suppressing double images regardless of the seated height of the observer, it is preferred that the partial wedge angle $C_x$ be the smallest among the three partial wedge angles of the partial wedge angle $A_x$, partial wedge angle $B_x$, and partial wedge angle $C_x$.

From the viewpoint of suppressing double images more effectively, especially from the viewpoint of suppressing double images regardless of the seated height of the observer more effectively, it is preferred that the partial wedge angle $A_x$ be the largest and the partial wedge angle $C_x$ be the smallest among the three partial wedge angles of the partial wedge angle $A_x$, partial wedge angle $B_x$, and partial wedge angle $C_x$.

In the interlayer film according to the present invention and the interlayer film in the laminated glass according to the present invention, a region between a position of 10 cm and a position of 59.5 cm from the one end toward the other end of the interlayer film is named region R. In the interlayer film according to the interlayer film and the interlayer film in the laminated glass according to the present invention, a region between a position of 10 cm and a position of 26.5 cm from the one end toward the other end of the interlayer film is named a first partial region. In the interlayer film according to the interlayer film and the interlayer film in the laminated glass according to the present invention, a region between a position of 26.5 cm and a position of 43 cm from the one end toward the other end of the interlayer film is named a second partial region. In the interlayer film according to the interlayer film and the interlayer film in the laminated glass according to the present invention, a region between a position of 43 cm and a position of 59.5 cm from the one end toward the other end of the interlayer film is named a third partial region.

The first partial region, the second partial region, and the third partial region are three regions obtained by equally dividing the region R into three regions in the direction connecting the one end and the other end. In the region R, the first partial region is located on the one end side. In the region R, the second partial region is located between the first partial region and the third partial region. In the region R, the third partial region is located on the other end side.

In the interlayer film according to the present invention, and the interlayer film in the laminated glass according to the present invention, the following partial wedge angle $\varphi_y$, partial wedge angle $A_y$, partial wedge angle $B_y$, and partial wedge angle $C_y$ are calculated.

Partial wedge angle $\varphi_y$ is a partial wedge angle in the region R.

Partial wedge angle $\varphi_y$ is a wedge angle determined from an approximation curve of the variation in thickness from the end part of one end side toward the end part of the other end side in the region R.

Specifically, partial wedge angle $\varphi_y$ is measured in the order of the following 1 to 3.

1: Points P are selected at intervals of 2 mm starting at the end part of the one end side of the region R and terminating at the end part of the other end side of the region R.

2: At each point P, the thickness of the interlayer film is measured.

3: Plotting the distance (unit: mm) from the end part of the one end side of the interlayer film on the x axis, and the thickness (unit: μm) of the interlayer film on the y axis, a primary line is obtained by the least-square method. The interior angle formed by the obtained primary line and the line of y=0 is defined as partial wedge angle $\varphi_y$.

Partial wedge angle $A_y$ is a partial wedge angle in the first partial region.

Partial wedge angle $A_y$ is a wedge angle determined from an approximation curve of the variation in thickness from the end part of one end side toward the end part of the other end side in the first partial region.

Specifically, partial wedge angle $A_y$ is measured in the order of the following 1 to 3.

1: Points P are selected at intervals of 2 mm starting at the end part of the one end side of the first partial region and terminating at the end part of the other end side of the first partial region.

2: At each point P, the thickness of the interlayer film is measured.

3: Plotting the distance (unit: mm) from the end part of the one end side of the interlayer film on the x axis, and the thickness (unit: μm) of the interlayer film on the y axis, a primary line is obtained by the least-square method. The interior angle formed by the obtained primary line and the line of y=0 is defined as partial wedge angle $A_y$.

Partial wedge angle $B_y$ is a partial wedge angle in the second partial region.

Partial wedge angle $B_y$ is a wedge angle determined from an approximation curve of the variation in thickness from the end part of one end side toward the end part of the other end side in the second partial region.

Specifically, partial wedge angle $B_y$ is measured in the order of the following 1 to 3.

1: Points P are selected at intervals of 2 mm starting at the end part of the one end side of the second partial region and terminating at the end part of the other end side of the second partial region.

2: At each point P, the thickness of the interlayer film is measured.

3: Plotting the distance (unit: mm) from the end part of the one end side of the interlayer film on the x axis, and the thickness (unit: μm) of the interlayer film on the y axis, a primary line is obtained by the least-square method. The interior angle formed by the obtained primary line and the line of y=0 is defined as partial wedge angle $B_y$.

Partial wedge angle $C_y$ is a partial wedge angle in the third partial region for display.

Partial wedge angle $C_y$ is a wedge angle determined from an approximation curve of the variation in thickness from the end part of one end side toward the end part of the other end side in the third partial region for display.

Specifically, partial wedge angle $C_y$ is measured in the order of the following 1 to 3.

1: Points P are selected at intervals of 2 mm starting at the end part of the one end side of the third partial region and terminating at the end part of the other end side of the third partial region.

2: At each point P, the thickness of the interlayer film is measured.

3: Plotting the distance (unit: mm) from the end part of the one end side of the interlayer film on the x axis, and the thickness (unit: μm) of the interlayer film on the y axis, a primary line is obtained by the least-square method. The interior angle formed by the obtained primary line and the line of y=0 is defined as partial wedge angle $C_y$.

In the above "1:" in measurement of partial wedge angle $\varphi_y$, partial wedge angle $A_y$, partial wedge angle $B_y$, and partial wedge angle $C_y$, points are selected up to the position where selection of points at 2-mm intervals can be made from the one end side toward the other end side (positions of which interval is not less than 2 mm).

In the interlayer film according to the present invention, and the interlayer film in the laminated glass according to the present invention, an absolute value of difference between partial wedge angles $A_y$ and partial wedge angle $\varphi_y$ is 0.05 mrad or less. If the absolute value of difference between partial wedge angle $A_y$ and partial wedge angle $\varphi_y$ is more than 0.05 mrad, double images can be generated.

From the viewpoint of effectively suppressing double images, an absolute value of difference between partial wedge angle $A_y$ and partial wedge angle $\varphi_y$ is preferably 0.04 mrad or less, more preferably 0.03 mrad or less. From the viewpoint of effectively suppressing double images, especially from the viewpoint of effectively suppressing double images regardless of the seated height of the observer, an absolute value of difference between partial wedge angle $A_y$ and partial wedge angle $\varphi_y$ is preferably more than 0 mrad, more preferably 0.01 mrad or more.

In the interlayer film according to the present invention, and the interlayer film in the laminated glass according to the present invention, an absolute value of difference between partial wedge angles $B_y$ and partial wedge angle $\varphi_y$ is 0.05 mrad or less. If the absolute value of difference between partial wedge angle $B_y$ and partial wedge angle $\varphi_y$ is more than 0.05 mrad, double images can be generated.

From the viewpoint of effectively suppressing double images, an absolute value of difference between partial wedge angle $B_y$ and partial wedge angle $\varphi_y$ is preferably 0.04 mrad or less, more preferably 0.03 mrad or less.

In the interlayer film according to the present invention, and the interlayer film in the laminated glass according to the present invention, an absolute value of difference between partial wedge angle $C_y$ and partial wedge angle $\varphi_y$ is 0.05 mrad or less. If the absolute value of difference between partial wedge angle $C_y$ and partial wedge angle $\varphi_y$ is more than 0.05 mrad, double images can be generated.

From the viewpoint of effectively suppressing double images, an absolute value of difference between partial wedge angle $C_y$ and partial wedge angle $\varphi_y$ is preferably 0.04 mrad or less, more preferably 0.03 mrad or less. From the viewpoint of effectively suppressing double images, especially from the viewpoint of effectively suppressing double images regardless of the seated height of the observer, an absolute value of difference between partial wedge angle $C_y$ and partial wedge angle $\varphi_y$ is preferably more than 0 mrad, more preferably 0.01 mrad or more.

From the viewpoint of suppressing double images more effectively, among three absolute values of difference: an absolute value of difference between partial wedge angle $A_y$ and partial wedge angle $\varphi_y$, an absolute value of difference between partial wedge angle $B_y$ and partial wedge angle $\varphi_y$, and an absolute value of difference between partial wedge angle $C_y$ and partial wedge angle $\varphi_y$, it is preferred that the absolute value of difference between partial wedge angle $B_y$ and partial wedge angle $\varphi_y$ be the smallest.

From the viewpoint of effectively suppressing double images, especially from the viewpoint of effectively suppressing double images regardless of the seated height of the observer, it is preferred that partial wedge angle $A_y$ be larger than partial wedge angle $\varphi_y$.

From the viewpoint of effectively suppressing double images, especially from the viewpoint of effectively suppressing double images regardless of the seated height of the observer, it is preferred that partial wedge angle $C_y$ be smaller than partial wedge angle $\theta_y$.

From the viewpoint of suppressing double images more effectively, especially from the viewpoint of suppressing double images more effectively regardless of the seated height of the observer, it is preferred that partial wedge angle $A_y$ be larger than partial wedge angle $\varphi_y$, and partial wedge angle $C_y$ be smaller than partial wedge angle $\varphi_y$.

From the viewpoint of effectively suppressing double images, and from the viewpoint of favorably obtaining a laminated glass suited for a vehicle in which the attachment angle of the windshield is large, such as a truck or a bus, the partial wedge angle $\varphi_y$ is preferably 0.8 mrad or more, more preferably 0.9 mrad or more, and is preferably 1.2 mrad or less, more preferably 1.1 mrad or less.

From the viewpoint of effectively suppressing double images, and from the viewpoint of favorably obtaining a laminated glass suited for a vehicle in which the attachment angle of the windshield is small, such as a sports car, the partial wedge angle $\varphi_y$ is preferably 0.2 mrad or more, more preferably 0.3 mrad or more, and is preferably 0.6 mrad or less, more preferably 0.5 mrad or less.

From the viewpoint of effectively suppressing double images, and from the viewpoint of favorably obtaining a laminated glass suited for a vehicle in which the attachment angle of the windshield is large, such as a truck or a bus, the partial wedge angle $A_y$ is preferably 1.0 mrad or more, more preferably 1.1 mrad or more, and is preferably 1.4 mrad or less, more preferably 1.3 mrad or less.

From the viewpoint of effectively suppressing double images, and from the viewpoint of favorably obtaining a laminated glass suited for a vehicle in which the attachment angle of the windshield is small, such as a sports car, the partial wedge angle $A_y$ is preferably 0.4 mrad or more, more preferably 0.5 mrad or more, and is preferably 0.8 mrad or less, more preferably 0.7 mrad or less.

From the viewpoint of effectively suppressing double images, and from the viewpoint of favorably obtaining a laminated glass suited for a vehicle in which the attachment angle of the windshield is large, such as a truck or a bus, the partial wedge angle $B_y$ is preferably 0.8 mrad or more, more preferably 0.9 mrad or more, and is preferably 1.2 mrad or less, more preferably 1.1 mrad or less.

From the viewpoint of effectively suppressing double images, and from the viewpoint of favorably obtaining a laminated glass suited for a vehicle in which the attachment angle of the windshield is small, such as a sports car, the partial wedge angle $B_y$ is preferably 0.2 mrad or more, more preferably 0.3 mrad or more, and is preferably 0.6 mrad or less, more preferably 0.5 mrad or less.

From the viewpoint of effectively suppressing double images, and from the viewpoint of favorably obtaining a laminated glass suited for a vehicle in which the attachment angle of the windshield is large, such as a truck or a bus, the partial wedge angle $C_y$ is preferably 0.6 mrad or more, more preferably 0.7 mrad or more, and is preferably 1.0 mrad or less, more preferably 0.9 mrad or less.

From the viewpoint of effectively suppressing double images, and from the viewpoint of favorably obtaining a laminated glass suited for a vehicle in which the attachment angle of the windshield is small, such as a sports car, the partial wedge angle $C_y$ is preferably 0 mrad or more, more preferably 0.1 mrad or more, and is preferably 0.4 mrad or less, more preferably 0.3 mrad or less.

From the viewpoint of effectively suppressing double images, especially from the viewpoint of effectively suppressing double images regardless of the seated height of the observer, it is preferred that partial wedge angle $A_y$ be the largest among the three partial wedge angles of the partial wedge angle $A_y$, partial wedge angle $B_y$, and partial wedge angle $C_y$.

From the viewpoint of effectively suppressing double images, especially from the viewpoint of effectively suppressing double images regardless of the seated height of the observer, it is preferred that partial wedge angle $C_y$ be the smallest among the three partial wedge angles of the partial wedge angle $A_y$, partial wedge angle $B_y$, and partial wedge angle $C_y$.

From the viewpoint of suppressing double images more effectively, especially from the viewpoint of suppressing double images regardless of the seated height of the observer more effectively, it is preferred that the partial wedge angle $A_y$ be the largest and the partial wedge angle $C_y$ be the smallest among the three partial wedge angles of the partial wedge angle $A_y$, partial wedge angle $B_y$, and partial wedge angle $C_y$.

As a method for controlling difference between partial wedge angle $A_x$ and partial wedge angle $\varphi_x$, difference between partial wedge angle $B_x$ and partial wedge angle ($\varphi_x$, difference between partial wedge angle $C_x$ and partial wedge angle $\varphi_x$, difference between partial wedge angle $A_y$ and partial wedge angle $\varphi_y$, difference between partial wedge angle $B_y$ and partial wedge angle $\varphi_y$, and difference between partial wedge angle $C_y$ and partial wedge angle $\varphi_y$, the following methods and the like can be recited. A method of adjusting the lip gap of the lip die within a certain range at the time of extrusion molding of the interlayer film, a method of adjusting the thickness by controlling the die temperature, and a method of adjusting the thickness by adjusting the pick-up speed of the interlayer film discharged from the lip die.

In order to suppress double images, the wedge angle θ of the interlayer film can be appropriately set according to the fitting angle of laminated glass. The wedge angle θ is a wedge angle of the interlayer film as a whole.

The wedge angle θ of the interlayer film is an interior angle formed at the intersection point between a straight line connecting surface parts on the one side of the interlayer film (first surface part) of the maximum thickness part and the minimum thickness part in the interlayer film, and a straight line connecting surface parts of the other side of the interlayer film (second surface part) of the maximum thickness part and the minimum thickness part in the interlayer film.

When there are a plurality of maximum thickness parts, there are a plurality of minimum thickness parts, the maximum thickness part is located in a certain region, or the minimum thickness part is located in a certain region, the maximum thickness part and the minimum thickness part for determining the wedge angle θ are selected so that the wedge angle θ to be determined is the maximum.

From the viewpoint of suppressing double images more effectively, the wedge angle θ of the interlayer film is preferably 0.05 mrad or more, more preferably 0.1 mrad (0.00575 degrees) or more, further preferably 0.2 mrad (0.0115 degrees) or more. When the wedge angle θ is the above lower limit or more, it is possible to obtain laminated glass suited for cars such as a truck or a bus in which the attachment angle of the windshield is large.

From the viewpoint of suppressing double images more effectively, the wedge angle θ of the interlayer film is preferably 2 mrad (0.1146 degrees) or less, and more preferably 0.7 mrad (0.0401 degrees) or less. When the wedge angle θ is the above upper limit or less, it is possible to obtain laminated glass suited for cars such as a sports car in which the attachment angle of the windshield is small.

In the interlayer film according to the present invention, and the interlayer film in the laminated glass according to the present invention, when partial wedge angle T in the following region A is measured, it is preferred that difference between the maximum value and the minimum value of partial wedge angle Ψ be 0.15 mrad or less.

Partial wedge angle Ψ is measured in the order of the following 1 to 2.

1: Define region A starting at a position of 20 cm from the one end toward the other end of the interlayer film and ending at a position of 59.5 cm from the one end toward the other end of the interlayer film, and select points A at 2-mm intervals.

2: Calculate partial wedge angle Ψ of the interlayer film in each partial region Ψ of 80 mm centered at each of the points A in the direction connecting the one end and the other end.

In the above step 1, points are selected up to the position where selection of points at 2-mm intervals can be made from the one end side toward the other end side (positions of which interval is not less than 2 mm).

In the above "2:", the partial region Ψ closest to the one end side of the interlayer film is a partial region Ψ1 of 16 cm to 24 cm from the one end, and the next partial region Ψ is a partial region Ψ2 of 16.2 cm to 24.2 cm from the one end. Neighboring two partial regions Ψ overlap with each other by 78 mm in the direction connecting the one end and the other end. Each partial region Ψ is a partial region of (16+0.2×n) cm to (24+0.2×n) cm from the one end (n is an integer).

In the above "2:", a partial wedge angle calculated at each partial region Ψ is referred to as partial wedge angle (θΨ).

One partial wedge angle (θΨ) is a wedge angle determined from an approximation curve of the variation in thickness from the end part of one end side toward the end part of the other end side in one partial region A.

The maximum value of partial wedge angles Ψ is the largest value among all the partial wedge angles Ψ measured in each partial region Ψ. The minimum value of partial wedge angles Ψ is the smallest value among all the partial wedge angles Ψ measured in each partial region Ψ.

It is preferred that the thickness increase from the one end toward the other end of the interlayer film in a region of 80% or more (more preferably 85% or more, further preferably 90% or more, especially preferably 95% or more) of the region between a position of 6 cm from the one end toward the other end of the interlayer film and a position of 63.8 cm from the one end toward the other end. In this case, it is possible to suppress double images more effectively.

It is preferred that the thickness increase from the one end toward the other end of the interlayer film in a region of 80% or more (more preferably 85% or more, further preferably 90% or more, especially preferably 95% or more) of the region between a position of 8 cm from the one end toward the other end of the interlayer film and a position of 61.8 cm from the one end toward the other end. In this case, it is possible to suppress double images more effectively.

It is preferred that the thickness increase from the one end toward the other end of the interlayer film in a region of 80% or more (more preferably 85% or more, further preferably 90% or more, especially preferably 95% or more) of the region between a position of 9 cm from the one end toward the other end of the interlayer film and a position of 60.8 cm from the one end toward the other end. In this case, it is possible to suppress double images more effectively.

It is preferred that the thickness increase from the one end toward the other end of the interlayer film in a region of 80% or more (more preferably 85% or more, further preferably 90% or more, especially preferably 95% or more) of the region between a position of 9.5 cm from the one end toward the other end of the interlayer film and a position of 60.3 cm from the one end toward the other end. In this case, it is possible to suppress double images more effectively.

It is more preferred that the thickness increase from the one end toward the other end of the interlayer film in a region of 80% or more (more preferably 85% or more, further preferably 90% or more, especially preferably 95% or more) of the region between a position of 10 cm from the one end toward the other end of the interlayer film and a position of 59.8 cm from the one end toward the other end. In this case, it is possible to suppress double images more effectively.

The interlayer film according to the present invention is suitably used for laminated glass that is a head-up display (HUD). It is preferred that the interlayer film according to the present invention be an interlayer film for HUD.

It is preferred that the laminated glass according to the present invention be a head-up display (HUD).

A head-up display system can be obtained by using the aforementioned head-up display. The head-up display system includes the laminated glass, and a light source device for irradiating the laminated glass with light for image display. The light source device can be attached, for example, to a dashboard in a vehicle. By irradiating the display region of the laminated glass with light from the light source device, it is possible to achieve image display.

It is preferred that the interlayer film according to the present invention have a region for display corresponding to a display region of HUD.

From the viewpoint of suppressing double images more effectively, it is preferred that the interlayer film have the region for display in a region between a position of 6 cm from the one end toward the other end of the interlayer film and a position of 63.8 cm from the one end toward the other end.

From the viewpoint of suppressing double images more effectively, it is preferred that the interlayer film have the region for display in a region between a position of 8 cm from the one end toward the other end of the interlayer film and a position of 61.8 cm from the one end toward the other end.

From the viewpoint of suppressing double images more effectively, it is preferred that the interlayer film have the region for display in a region between a position of 9 cm from the one end toward the other end of the interlayer film and a position of 60.8 cm from the one end toward the other end.

From the viewpoint of suppressing double images more effectively, it is preferred that the interlayer film have the region for display in a region between a position of 9.5 cm from the one end toward the other end of the interlayer film and a position of 60.3 cm from the one end toward the other end.

From the viewpoint of suppressing double images more effectively, it is more preferred that the interlayer film have the region for display in a region between a position of 10 cm from the one end toward the other end of the interlayer film and a position of 59.8 cm from the one end toward the other end.

The region for display may exist in a part or the whole of the region up to the aforementioned position (for example, 63.8 mm) from the one end toward the other end of the interlayer film. The region for display may exist in a size of about 30 cm in the direction connecting the one end and the other end.

From the viewpoint of suppressing double images effectively, it is preferred that the interlayer film have a portion with a sectional shape in the thickness direction of a wedge-like shape in the region between a position of 6 cm from the one end toward the other end of the interlayer film and a position of 63.8 cm from the one end toward the other end.

From the viewpoint of suppressing double images effectively, it is preferred that the interlayer film have a portion with a sectional shape in the thickness direction of a wedge-like shape in the region between a position of 8 cm from the one end toward the other end of the interlayer film and a position of 61.8 cm from the one end toward the other end.

From the viewpoint of suppressing double images effectively, it is preferred that the interlayer film have a portion with a sectional shape in the thickness direction of a wedge-like shape in the region between a position of 9 cm from the one end toward the other end of the interlayer film and a position of 60.8 cm from the one end toward the other end.

From the viewpoint of suppressing double images effectively, it is preferred that the interlayer film have a portion with a sectional shape in the thickness direction of a wedge-like shape in the region between a position of 9.5 cm from the one end toward the other end of the interlayer film and a position of 60.3 cm from the one end toward the other end.

From the viewpoint of suppressing double images effectively, it is more preferred that the interlayer film have a portion with a sectional shape in the thickness direction of a wedge-like shape in the region between a position of 10 cm from the one end toward the other end of the interlayer film and a position of 59.8 cm from the one end toward the other end.

The portion with a sectional shape in the thickness direction of a wedge-like shape may exist in a part or the whole of the region up to the aforementioned position (for example, 63.8 mm) from the one end toward the other end. The portion with a sectional shape in the thickness direction of a wedge-like shape may exist in a size of about 30 cm in the direction connecting the one end and the other end.

The interlayer film according to the present invention may have a shading region. The shading region may be separate from the region for display. The shading region is provided so as to prevent a driver from feeling glare while driving, for example, by sunlight or outdoor lighting. The shading region can be provided so as to impart the heat blocking property. It is preferred that the shading region be located in an edge portion of the interlayer film. It is preferred that the shading region be belt-shaped.

In the shading region, a coloring agent or a filler may be used so as to change the color and the visible light transmittance. The coloring agent or the filler may be contained in a partial region in the thickness direction of the interlayer film or may be contained in the entire region in the thickness direction of the interlayer film.

From the viewpoint of providing better display, and further broadening the field of view, the visible light transmittance of the region for display is preferably 80% or more, more preferably 88% or more, further preferably 90% or more. It is preferred that the visible light transmittance of the region for display be higher than the visible light transmittance of the shading region. The visible light transmittance of the region for display may be lower than the visible light transmittance of the shading region. The visible light transmittance of the region for display is higher than the visible light transmittance of the shading region preferably by 50% or more, more preferably by 60% or more.

When the visible light transmittance varies in the interlayer film of each of the region for display and the shading region, the visible light transmittance is measured at the center position of the region for display and at the center position of the shading region.

The visible light transmittance at a wavelength ranging from 380 nm to 780 nm of the obtained laminated glass can be measured by using a spectrophotometer ("U-4100" available from Hitachi High-Tech Corporation) in conformity with JIS R3211:1998. As the glass plate, it is preferred to use clear glass having a thickness of 2 mm.

It is preferred that the region for display have a length direction and a width direction. For excellent versatility of the interlayer film, it is preferred that the width direction of the region for display be the direction connecting the one end and the other end. It is preferred that the region for display be belt-shaped.

It is preferred that the interlayer film has an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film. It is preferred that the one end and the other end be located on either side of the TD direction.

From the viewpoint of better display, it is preferred that the interlayer film have a portion with a sectional shape in the thickness direction of a wedge-like shape. It is preferred that the sectional shape in the thickness direction of the region for display be a wedge-like shape.

Hereinafter, specific embodiments of the present invention will be described with reference to the drawings.

FIGS. 1(a) and (b) are a sectional view and a front view, respectively, schematically showing an interlayer film for laminated glass in accordance with a first embodiment of the present invention. FIG. 1(a) is a sectional view along the line I-I in FIG. 1(b). The size and dimension of the interlayer film in FIG. 1 and later described drawings are appropriately changed from the actual size and shape for convenience of illustration.

In FIG. 1(a), a section in the thickness direction of an interlayer film 11 is shown. In this connection, in FIG. 1(a) and later described drawings, for convenience of illustration, the thicknesses of an interlayer film and respective layers constituting the interlayer film and the wedge angle (θ) are shown so as to be different from actual thicknesses thereof and an actual wedge angle.

The interlayer film 11 is provided with a first layer 1 (intermediate layer), a second layer 2 (surface layer), and a third layer 3 (surface layer). The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 is a multilayer interlayer film.

The interlayer film 11 has one end 11a and the other end 11b at the opposite side of the one end 11a. The one end 11a and the other end 11b are end parts of both sides facing each other. The sectional shape in the thickness direction of each of the second layer 2 and the third layer 3 is a wedge-like shape. The sectional shape in the thickness direction of the first layer 1 is a rectangular shape. The thicknesses of the second layer 2 and the third layer 3 are larger in the other end 11b side than in the one end 11a side. Accordingly, the thickness of the other end 11b of the interlayer film 11 is larger than the thickness of the one end 11a thereof. Accordingly, the interlayer film 11 has a region being thin in thickness and a region being thick in thickness.

The interlayer film 11 has a region where the thickness increases from the one end 11a side to the other end 11b side. In the interlayer film 11, the increment of the thickness is constant from the one end 11a side to the other end 11b side in the region where the thickness increases.

The interlayer film 11 has a region for display R1 corresponding to a display region of a head-up display. The region for display R1 has a first partial region for display R11, a second partial region for display R12, and a third partial region for display R13. The first partial region for display R11, the second partial region for display R12, and the third partial region for display R13 are three regions obtained by equally dividing the region for display R1 into three in the direction connecting the one end 11a and the other end 11b. In the region for display R1, the first partial region for display R11 is located on the one end 11a side. In the region for display R1, the second partial region for display R12 is located between the first partial region for display R11 and the third partial region for display R13. In the region for display R1, the third partial region for display R13 is located on the other end 11b side.

In the present embodiment, the region for display R1 is a region between a position of 10 cm from the one end 11a toward the other end 11b and a position of 59.5 cm from the one end 11a toward the other end 11b. In the present embodiment, the first partial region for display R11 is a region between a position of 10 cm from the one end 11a toward the other end 11b and a position of 26.5 cm from the one end 11a toward the other end 11b. In the present embodiment, the second partial region for display R12 is a region between a position of 26.5 cm from the one end 11a toward the other end 11b and a position of 43 cm from the one end 11a toward the other end 11b. In the present embodiment, the third partial region for display R13 is a region between a position of 43 cm from the one end 11a toward the other end 11b and a position of 59.5 cm from the one end 11a toward the other end 11b.

The interlayer film 11 has a surrounding region R2 neighboring the region for display R1.

The interlayer film 11 has a shading region R3 that is separate from the region for display R1. The shading region R3 is located in an edge portion of the interlayer film 11.

The interlayer film has a shape as shown in FIG. 1(a), and may have a one-layer structure, a two-layer structure or four or more-layer structure.

FIG. 8 is a perspective view schematically showing a roll body prepared by winding the interlayer film for laminated glass shown in FIG. 1.

An interlayer film 11 may be wound to be formed into a roll body 51 of the interlayer film 11.

The roll body 51 shown in FIG. 8 includes a winding core 61 and the interlayer film 11. The interlayer film 11 is wound around an outer periphery of the winding core 61.

FIGS. 2 (a) and (b) are a sectional view and a front view, respectively, schematically showing an interlayer film for laminated glass in accordance with a second embodiment of the present invention. FIG. 2(a) is a sectional view along the line I-I in FIG. 2(b). In FIG. 2(a), a section in the thickness direction of an interlayer film 11A is shown.

The interlayer film 11A shown in FIG. 2 is provided with a first layer 1A. The interlayer film 11A has a one-layer structure composed only of the first layer 1A and is a single-layered interlayer film. The interlayer film 11A is singly constituted by the first layer 1A. The interlayer film 11A is used for obtaining laminated glass. The interlayer film 11A is an interlayer film for laminated glass.

The interlayer film 11A has one end 11a and the other end 11b at the opposite side of the one end 11a. The one end 11a and the other end 11b are end parts of both sides facing each other. The thickness of the other end 11b of the interlayer film 11A is larger than the thickness of the one end 11a thereof. Accordingly, the first layer 1A corresponding to the interlayer film 11A has a region being thin in thickness and a region being thick in thickness.

The interlayer film 11A has a region where the thickness increases from the one end 11a side to the other end 11b side. In the interlayer film 11A, the increment of the thickness is constant from the one end 11a side to the other end 11b side in the region where the thickness increases.

The interlayer film 11A and the first layer 1A have portions 11Aa, 1Aa having a rectangular sectional shape in the thickness direction, and portions 11Ab, 1Ab having a wedge-like sectional shape in the thickness direction.

The interlayer film 11A has a region for display R1 corresponding to a display region of a head-up display. The region for display R1 has a first partial region for display R11, a second partial region for display R12, and a third partial region for display R13. The first partial region for display R11, the second partial region for display R12, and the third partial region for display R13 are three regions obtained by equally dividing the region for display R1 into three in the direction connecting the one end 11a and the other end 11b. In the region for display R1, the first partial region for display R11 is located on the one end 11a side. In the region for display R1, the second partial region for display R12 is located between the first partial region for display R11 and the third partial region for display R13. In the region for display R1, the third partial region for display R13 is located on the other end 11b side.

The interlayer film 11A has a surrounding region R2 neighboring the region for display R1.

The interlayer film 11A has a shading region R3 that is separate from the region for display R1. The shading region R3 is located in an edge portion of the interlayer film 11A.

The interlayer film has a shape as shown in FIG. 2(a) and may have a two or more layer structure.

FIG. 3 is a sectional view schematically showing an interlayer film for laminated glass in accordance with a third embodiment of the present invention. In FIG. 3, a section in the thickness direction of an interlayer film 11B is shown.

The interlayer film 11B shown in FIG. 3 includes a first layer 1B (intermediate layer), a second layer 2B (surface layer), and a third layer 3B (surface layer). The interlayer film 11 and the interlayer film 11B are different from each other in the increment of the thickness in the region where the thickness increases.

The interlayer film 11B has a region where the thickness increases from the one end 11a side to the other end 11b side. The interlayer film 11B has a portion where the increment of the thickness increases from the one end 11a side to the other end 11b side in the region where the thickness increases. The interlayer film 11B has a region with a sectional shape in the thickness direction of a wedge-like shape. The interlayer film 11B has a portion where the wedge angle increases from the one end side to the other end side in the region with a sectional shape in the thickness direction of a wedge-like shape.

The interlayer film 11B has a region for display R1 corresponding to a display region of a head-up display. The region for display R1 has a first partial region for display R11, a second partial region for display R12, and a third partial region for display R13. The first partial region for display R11, the second partial region for display R12, and the third partial region for display R13 are three regions obtained by equally dividing the region for display R1 into three in the direction connecting the one end 11a and the other end 11b. In the region for display R1, the first partial region for display R11 is located on the one end 11a side. In the region for display R1, the second partial region for display R12 is located between the first partial region for display R11 and the third partial region for display R13. In the region for display R1, the third partial region for display R13 is located on the other end 11b side.

The region for display R1 has a region where the thickness increases from the one end 11a side to the other end 11b side. The region for display R1 may have a portion where the increment of the thickness varies from the one end 11a side to the other end 11b side in the region where the thickness increases. The region for display R1 has a region with a sectional shape in the thickness direction of a wedge-like shape. The region for display R1 may have a portion where the wedge angle varies from the one end side to the other end side in the region with a sectional shape in the thickness direction of a wedge-like shape.

The interlayer film 11B has a surrounding region R2 neighboring the region for display R1.

The interlayer film 11B has a shading region R3 that is separate from the region for display R1. The shading region R3 is located in an edge portion of the interlayer film 11B.

FIG. 4 is a sectional view schematically showing an interlayer film for laminated glass in accordance with a fourth embodiment of the present invention. In FIG. 4, a section in the thickness direction of an interlayer film 11C is shown.

The interlayer film 11C shown in FIG. 4 includes a first layer 1C. The interlayer film 11C has a one-layer structure composed only of the first layer 1C and is a single-layered interlayer film. The interlayer film 11A and the interlayer film 11C are different from each other in the increment of the thickness in the region where the thickness increases.

The interlayer film 11C has a region where the thickness increases from the one end 11a side to the other end 11b side. The interlayer film 11C has a portion where the increment of the thickness increases from the one end 11a side to the other end 11b side in the region where the thickness increases. The interlayer film 11C has a region with a sectional shape in the thickness direction of a wedge-like shape. The interlayer film 11C has a portion where the wedge angle increases from the one end side to the other end side in the region with a sectional shape in the thickness direction of a wedge-like shape.

The interlayer film 11C and the first layer 1C have portions 11Ca, 1Ca having a rectangular sectional shape in the thickness direction, and portions 11Cb, 1Cb having a wedge-like sectional shape in the thickness direction.

The interlayer film 11C has a region for display R1 corresponding to a display region of a head-up display. The region for display R1 has a first partial region for display R11, a second partial region for display R12, and a third partial region for display R13. The first partial region for display R11, the second partial region for display R12, and the third partial region for display R13 are three regions obtained by equally dividing the region for display R1 into three in the direction connecting the one end 11a and the other end 11b. In the region for display R1, the first partial region for display R11 is located on the one end 11a side. In the region for display R1, the second partial region for display R12 is located between the first partial region for display R11 and the third partial region for display R13. In the region for display R1, the third partial region for display R13 is located on the other end lib side.

The region for display R1 has a region where the thickness increases from the one end 11a side to the other end 11b side. The region for display R1 may have a portion where the increment of the thickness varies from the one end 11a side to the other end 11b side in the region where the thickness increases. The region for display R1 has a region with a sectional shape in the thickness direction of a wedge-like shape. The region for display R1 may have a portion where the wedge angle varies from the one end side to the other end side in the region with a sectional shape in the thickness direction of a wedge-like shape.

The interlayer film 11C has a surrounding region R2 neighboring the region for display R1.

The interlayer film 11C has a shading region R3 that is separate from the region for display R1. The shading region R3 is located in an edge portion of the interlayer film 11C.

FIG. 5 is a sectional view schematically showing an interlayer film for laminated glass in accordance with a fifth embodiment of the present invention. In FIG. 5, a section in the thickness direction of an interlayer film 11D is shown.

The interlayer film 11D shown in FIG. 5 includes a first layer 1D (intermediate layer), a second layer 2D (surface layer), and a third layer 3D (surface layer). The interlayer film 11 and the interlayer film 11D are different from each other in the increment of the thickness in the region where the thickness increases.

The interlayer film 11D has a region where the thickness increases from the one end 11a side to the other end 11b side. The interlayer film 11D has a portion where the increment of the thickness decreases from the one end 11a side to the other end lib side in the region where the thickness increases. The interlayer film 11D has a region with a sectional shape in the thickness direction of a wedge-like shape. The interlayer film 11D has a portion where the wedge angle decreases from the one end side to the other end side in the region with a sectional shape in the thickness direction of a wedge-like shape.

The interlayer film 11D has a region for display R1 corresponding to a display region of a head-up display. The region for display R1 has a first partial region for display R11, a second partial region for display R12, and a third partial region for display R13. The first partial region for display R11, the second partial region for display R12, and the third partial region for display R13 are three regions obtained by equally dividing the region for display R1 into three in the direction connecting the one end 11a and the other end 11b. In the region for display R1, the first partial region for display R11 is located on the one end 11a side. In the region for display R1, the second partial region for display R12 is located between the first partial region for display R11 and the third partial region for display R13. In the region for display R1, the third partial region for display R13 is located on the other end 11b side.

The region for display R1 has a region where the thickness increases from the one end 11a side to the other end 11b side. The region for display R1 may have a portion where the increment of the thickness varies from the one end 11a side to the other end 11b side in the region where the thickness increases. The region for display R1 has a region with a sectional shape in the thickness direction of a wedge-like shape. The region for display R1 may have a portion where the wedge angle varies from the one end side to the other end side in the region with a sectional shape in the thickness direction of a wedge-like shape.

The interlayer film 11D has a surrounding region R2 neighboring the region for display R1.

The interlayer film 11D has a shading region R3 that is separate from the region for display R1. The shading region R3 is located in an edge portion of the interlayer film 11D.

FIG. 6 is a sectional view schematically showing an 1C interlayer film for laminated glass in accordance with a sixth embodiment of the present invention. In FIG. 6, a section in the thickness direction of an interlayer film 11E is shown.

The interlayer film 11E shown in FIG. 6 includes a first layer 1E. The interlayer film 11E has a one-layer structure composed only of the first layer 1E and is a single-layered interlayer film. The interlayer film 11A and the interlayer film 11E are different from each other in the increment of the thickness in the region where the thickness increases.

The interlayer film 11E has a region where the thickness increases from the one end 11a side to the other end 11b side. The interlayer film 11E may have a portion where the increment of the thickness varies from the one end 11a side to the other end 11b side in the region where the thickness increases. The interlayer film 11E has a region with a sectional shape in the thickness direction of a wedge-like shape. The interlayer film 11E may have a portion where the wedge angle varies from the one end side to the other end side in the region with a sectional shape in the thickness direction of a wedge-like shape.

The interlayer film 11E and the first layer 1E have portions 11Ea, 1Ea having a rectangular sectional shape in the thickness direction, and portions 11Eb, 1Eb having a wedge-like sectional shape in the thickness direction.

The interlayer film 11E has a region for display R1 corresponding to a display region of a head-up display. The region for display R1 has a first partial region for display R11, a second partial region for display R12, and a third partial region for display R13. The first partial region for display R11, the second partial region for display R12, and the third partial region for display R13 are three regions obtained by equally dividing the region for display R1 into three in the direction connecting the one end 11a and the other end 11b. In the region for display R1, the first partial region for display R11 is located on the one end 11a side. In the region for display R1, the second partial region for display R12 is located between the first partial region for display R11 and the third partial region for display R13. In the region for display R1, the third partial region for display R13 is located on the other end 11b side.

The region for display R1 has a region where the thickness increases from the one end 11a side to the other end 11b side. The region for display R1 may have a portion where the increment of the thickness varies from the one end 11a side to the other end 11b side in the region where the thickness increases. The region for display R1 has a region with a sectional shape in the thickness direction of a wedge-like shape. The region for display R1 may have a portion where the wedge angle varies from the one end side to the other end side in the region with a sectional shape in the thickness direction of a wedge-like shape.

The interlayer film 11E has a surrounding region R2 neighboring the region for display R1.

The interlayer film 11E has a shading region R3 that is separate from the region for display R1. The shading region R3 is located in an edge portion of the interlayer film 11E.

It is preferred that the interlayer film have a portion with a sectional shape in the thickness direction of a wedge-like shape. It is preferred that the interlayer film have a portion where the thickness gradually increases from one end toward the other end. It is preferred that the sectional shape in the thickness direction of the interlayer film be a wedge-like shape. Examples of the sectional shape in the thickness direction of the interlayer film include a trapezoidal shape, a triangular shape, a pentagonal shape, and the like.

In the above-described interlayer film, the thickness may not increase evenly from the one end toward the other end of the interlayer film. The above-described interlayer film may have a projecting portion on the surface, or a recess portion on the surface.

From the viewpoint of further suppressing double images, it is preferred that the interlayer film have a portion where the increment of the thickness increases from the one end side to the other end side in the region where the thickness increases. From the viewpoint of further suppressing double images, it is preferred that the interlayer film have a portion where the wedge angle increases from the one end side to the other end side in the region where the sectional shape in the thickness direction is a wedge-like shape.

The thickness of the interlayer film is not particularly limited. The thickness of the interlayer film refers to the total thickness of the respective layers constituting the interlayer film. Thus, in the case of a multi-layered interlayer film 11, the thickness of the interlayer film refers to the total thickness of the first layer 1, the second layer 2, and the third layer 3.

The maximum thickness of the interlayer film is preferably 0.1 mm or more, more preferably 0.25 mm or more, further preferably 0.5 mm or more, especially preferably 0.8 mm or more and is preferably 3 mm or less, more preferably 2 mm or less, further preferably 1.5 mm or less.

A distance between one end and the other end of the interlayer film is defined as X. It is preferred that the interlayer film have a minimum thickness in the region at a distance of 0X to 0.2X inwardly from the one end, and a maximum thickness in the region at a distance of 0X to 0.2X inwardly from the other end. It is more preferred that the interlayer film have a minimum thickness in the region at a distance of 0X to 0.1X inwardly from the one end, and a maximum thickness in the region at a distance of 0X to 0.1X inwardly from the other end. It is preferred that the interlayer film have a minimum thickness at the one end and the interlayer film have a maximum thickness at the other end.

The interlayer films 11, 11A, 11B, 11C, 11D, 11E have a maximum thickness in the other end 11b and a minimum thickness in the one end 11a.

The interlayer film may have a uniform-thickness part. The uniform-thickness part means that the variation in thickness does not exceed 10 µm per a distance range of 10 cm in the direction connecting the one end and the other end of the interlayer film. Therefore, the uniform-thickness part refers to the part where the variation in thickness does not exceed 10 µm per a distance range of 10 cm in the direction connecting the one end and the other end of the interlayer film. To be more specific, the uniform-thickness part refers to the part where the thickness does not vary at all in the direction connecting the one end and the other end of the interlayer film, or the thickness varies by 10 µm or less per a distance range of 10 cm in the direction connecting the one end and the other end of the interlayer film.

From the viewpoint of the practical aspect and the viewpoint of sufficiently enhancing the adhesive force and the penetration resistance, the maximum thickness of a surface layer in the interlayer film is preferably 0.001 mm or more, more preferably 0.2 mm or more, further preferably 0.3 mm or more, and is preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers in the interlayer film is preferably 0.001 mm or more, more preferably 0.1 mm or more, and further preferably 0.2 mm or more and is preferably 0.8 mm or less, more preferably 0.6 mm or less, and further preferably 0.3 mm or less.

The distance X between one end and the other end of the interlayer film is preferably 3 m or less, more preferably 2 m or less, especially preferably 1.5 m or less, and preferably 0.5 m or more, more preferably 0.8 m or more, and especially preferably 1 m or more.

As a measuring device for use for measurement of a partial wedge angle of the interlayer film, a wedge angle (θ) of the interlayer film, and a thickness of the interlayer film, a contact type thickness measuring instrument "TOF-4R" (available from Yamabun Electronics Co., Ltd.) or the like can be recited.

Measurement of the thickness is conducted so that the distance is the shortest from the one end toward the other end by using the above-described measuring device at a film conveyance speed of 2.15 mm/minute to 2.25 mm/minute.

As a measuring device for use for measurement of a partial wedge angle of the interlayer film, a wedge angle (θ) of the interlayer film, and a thickness of the interlayer film after the interlayer film is made into laminated glass, a non-contact type multilayer film thickness measuring instrument "OPTIGAUGE" (available from Lumetrics, Inc.) or the like can be recited. The thickness of the interlayer film can be measured while the interlayer film is in the laminated glass.

Hereinafter, the details of materials constituting the respective layers of a multi-layered interlayer film and the single-layered interlayer film will be described.

(Resin)

It is preferred that the interlayer film contain a resin. One kind of the resin may be used alone, and two or more kinds thereof may be used in combination.

Examples of the resin include thermosetting resins and thermoplastic resins.

It is preferred that the interlayer film contain a resin (hereinafter, sometimes described as a resin (0)). It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a resin (hereinafter, sometimes described as a resin (1)). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a resin (hereinafter, sometimes described as a resin (2)). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a resin (hereinafter, sometimes described as a resin (3)). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The resin (1), the resin (2), and the resin (3) may be the same as or different from one another. For still higher sound insulating properties, it is preferred that the resin (1) be different from the resin (2) and the resin (3). The thermoplastic resin (1), the thermoplastic resin (2), and the thermoplastic resin (3) may be the same or different from one another. For still higher sound insulating properties, it is preferred that the thermoplastic resin (1) be different from the thermoplastic resin (2) and the thermoplastic resin (3). Each of the polyvinyl acetal resin (1), the polyvinyl acetal resin (2) and the polyvinyl acetal resin (3) may be the same or different from one another. For still higher sound insulating properties, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, a polyester resin, an ethylene-vinyl acetate copolymer resin, an ethylene-acrylic acid copolymer resin, a polyurethane resin, a polyvinyl alcohol resin, and the like. Thermoplastic resins other than these may be used. The polyoxymethylene (or polyacetal) resin is included in the polyvinyl acetal resin.

It is preferred that the resin be a thermoplastic resin. The thermoplastic resin is more preferably a polyvinyl acetal resin or a polyester resin, and is further preferably a polyvinyl acetal resin. By using a polyvinyl acetal resin and a plasticizer together, the adhesive force of a layer containing the polyvinyl acetal resin and the plasticizer to a lamination glass member or another layer is further enhanced. It is preferred that the polyvinyl acetal resin be a polyvinyl butyral resin.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more and is preferably 5000 or less, more preferably 4000 or less, further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered. The number of carbon atoms of the acetal group in the polyvinyl acetal resin may be 4 or 5.

Aldehyde is not particularly limited. In general, an aldehyde with 1 to 10 carbon atoms is preferably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, and benzaldehyde. The aldehyde is preferably propionaldehyde, n-butyraldehyde, isobutyraldehyde, n-hexylaldehyde, or n-valeraldehyde, more preferably propionaldehyde, n-butyraldehyde, or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

The content of the hydroxyl group (hydroxyl group amount) of the polyvinyl acetal resin (1) is preferably 17% by mole or more, more preferably 20% by mole or more, and further preferably 22% by mole or more. The content of the hydroxyl group (the amount of hydroxyl groups) of the polyvinyl acetal resin (1) is preferably 30% by mole or less, more preferably 28% by mole or less, still more preferably 27% by mole or less, further preferably 25% by mole or less, especially preferably less than 25% by mole, most preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, when being 28% by mole or less, the sound insulating properties of laminated glass are further enhanced, and when being 28% by mole or less, the sound insulating properties are further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, still more preferably 30% by mole or more, further preferably more than 31% by mole, still further preferably 31.5% by mole or more, especially preferably 32% by mole or more, and most preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). From the viewpoint of still further enhancing the sound insulating properties, the absolute value of a difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating properties, the absolute value of a difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. An absolute value of difference between the content of the hydroxyl group of the polyvinyl acetal resin (1) and the content of the hydroxyl group of the polyvinyl acetal resin (2) is preferably 20% by mole or less. An absolute value of difference between the content of the hydroxyl group of the polyvinyl acetal resin (1) and the content of the hydroxyl group of the polyvinyl acetal resin (3) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in conformity with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more and more preferably 0.5% by mole or more and is preferably 10% by mole or less and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more and more preferably 63% by mole or more and is preferably 85% by mole or less, more preferably 75% by mole or less, further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more and more preferably 60% by mole or more and is preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

In 100% by weight of the thermoplastic resin contained in the interlayer film, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the thermoplastic resin of the interlayer film be a polyvinyl acetal resin.

(Plasticizer)

From the viewpoint of further heightening the adhesive force of an interlayer film, it is preferred that the interlayer film according to the present invention contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

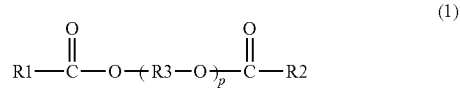

(1)

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate (3GO) or triethylene glycol di-2-ethylbutyrate (3GH), and it is further preferred that the plasticizer include triethylene glycol di-2-ethylhexanoate.

In the interlayer film, a content of the plasticizer (0) relative to 100 parts by weight of the resin (0) (when the resin (0) is thermoplastic resin (0), 100 parts by weight of the thermoplastic resin (0); when the resin (0) is polyvinyl acetal resin (0), 100 parts by weight of the polyvinyl acetal resin (0)) is referred to as content (0). The content (0) is preferably 25 parts by weight or more, more preferably 30 parts by weight or more, and is preferably 100 parts by weight or less, more preferably 60 parts by weight or less, further preferably 50 parts by weight or less. When the content (0)

is the above lower limit or more, the penetration resistance of laminated glass is further enhanced. When the content (0) is the above upper limit or less, the transparency of the interlayer film is further enhanced.

In the first layer, a content of the plasticizer (1) relative to 100 parts by weight of the resin (1) (when the resin (1) is thermoplastic resin (1), 100 parts by weight of the thermoplastic resin (1); when the resin (1) is polyvinyl acetal resin (1), 100 parts by weight of the polyvinyl acetal resin (1)) is referred to as content (1). The content (1) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the second layer, a content of the plasticizer (2) relative to 100 parts by weight of the resin (2) (when the resin (2) is thermoplastic resin (2), 100 parts by weight of the thermoplastic resin (2); when the resin (2) is polyvinyl acetal resin (2), 100 parts by weight of the polyvinyl acetal resin (2)) is referred to as content (2). In the third layer, a content of the plasticizer (3) relative to 100 parts by weight of the resin (3) (when the resin (3) is thermoplastic resin (3), 100 parts by weight of the thermoplastic resin (3); when the resin (3) is polyvinyl acetal resin (3), 100 parts by weight of the polyvinyl acetal resin (3)) is referred to as content (3). Each of the content (2) and the content (3) is preferably 10 parts by weight or more, more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of heightening the sound insulating properties of laminated glass, it is preferred that the content (1) be larger than the content (2) and it is preferred that the content (1) be larger than the content (3).

From the viewpoint of further enhancing the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Heat Shielding Substance)

It is preferred that the interlayer film contain a heat shielding substance (heat shielding compound). It is preferred that the first layer contain a heat shielding substance. It is preferred that the second layer contain a heat shielding substance. It is preferred that the third layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding compound may be constituted of both of the Ingredient X and the heat shielding particles.

Ingredient X:

It is preferred that the interlayer film include at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding property of the laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles.

In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), each content of the heat shielding particles (in particular, the content of tungsten oxide particles) is preferably 0.01% by weight or more, more preferably 0.1% by weight or more, further preferably 1% by weight or more, especially preferably 1.5% by weight or more. In 100% by weight of the interlayer film or in 100% by weight of a layer containing the heat shielding particles (a first layer, a second layer, or a third layer), each content of the heat shielding particles (in particular, the content of tungsten oxide particles) is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding property is sufficiently enhanced and the visible light transmittance is sufficiently enhanced.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt contained in the interlayer film contain at least one kind of metal between K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in the interlayer film containing the Metal salt M or a layer containing the Metal salt M (a first layer, a second layer, or a third layer) is preferably 5 ppm or more, more preferably 10 ppm or more, further preferably 20 ppm or more, and is preferably 300 ppm or less, more preferably 250 ppm or less, further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, or a third layer), the content of the ultraviolet ray screening agent and the content of the benzotriazole compound are preferably 0.1% by weight or more, more preferably 0.2% by weight or more, further preferably 0.3% by weight or more, especially preferably 0.5% by weight or more. In 100% by weight of the interlayer film or in 100% by weight of a layer containing the ultraviolet ray screening agent (a first layer, a second layer, or a third layer), the content of the ultraviolet ray screening agent and the content of the benzotriazole compound are preferably 2.5% by weight or less, more preferably 2% by weight or less, further preferably 1% by weight or less, especially preferably 0.8% by weight or less. When the content of the ultraviolet ray screening agent is the above-described lower limit or more and the above-described upper limit or less, deterioration in visible light transmittance after a lapse of a period can be further suppressed. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

For maintaining high visible light transmittance of the interlayer film and the laminated glass over a long period of time, it is preferred that the content of the oxidation inhibitor be 0.1% by weight or more in 100% by weight of the interlayer film or in 100% by weight of a layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the interlayer film, the first layer, the second layer, and the third layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(Laminated Glass)

FIG. 7 is a sectional view showing an example of a laminated glass prepared with the interlayer film for laminated glass shown in FIG. 1.

A laminated glass 21 shown in FIG. 7 is provided with the interlayer film 11, a first lamination glass member 22, and a second lamination glass member 23. The interlayer film 11 is arranged between the first lamination glass member 22 and the second lamination glass member 23 to be sandwiched therebetween. The first lamination glass member 22 is arranged on a first surface of the interlayer film 11. The second lamination glass member 23 is arranged on a second surface opposite to the first surface of the interlayer film 11.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET (polyethylene terephthalate) film and the interlayer film include at least one glass plate as the first lamination glass member or the second lamination glass member. It is especially preferred that both of the first lamination glass member and the second lamination glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 0.03 mm or more, more preferably 1 mm or more and is preferably 5 mm or less. When the lamination glass member is a glass plate, the thickness of the glass plate is preferably 1 mm or more and is preferably 5 mm or less. When the lamination glass member is a PET film, the thickness of the PET film is preferably 0.03 mm or more and is preferably 0.5 mm or less.

The wedge angle of the first lamination glass member is 0 mrad or more (not being wedge-like shaped at 0 mrad). The wedge angle of the first lamination glass member is preferably 0 mrad or more, more preferably 0.05 mrad or more, still more preferably 0.10 mrad or more, further preferably 0.15 mrad or more, especially preferably 0.20 mrad or more, most preferably 0.25 mrad or more. The wedge angle of the first lamination glass member is preferably 2.0 mrad or less, more preferably 1.5 mrad or less. When the wedge angle of the first lamination glass member is the above lower limit or more and the above upper limit or less, it is possible to further suppress double images.

The wedge angle of the second lamination glass member is 0 mrad or more (not being wedge-like shaped at 0 mrad). The wedge angle of the second lamination glass member is preferably 0 mrad or more, more preferably 0.05 mrad or more, still more preferably 0.10 mrad or more, further preferably 0.15 mrad or more, especially preferably 0.20 mrad or more, most preferably 0.25 mrad or more. The wedge angle of the second lamination glass member is preferably 2.0 mrad or less, more preferably 1.5 mrad or less. When the wedge angle of the first lamination glass member is the above lower limit or more and the above upper limit or less, it is possible to further suppress double images.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first lamination glass member and the interlayer film, and between the second lamination glass member and the interlayer film is removed. Then, the laminate is preliminarily bonded together at about 70° C. to 110° C. to obtain a preliminarily press-bonded laminate. Next, by putting the preliminarily press-bonded laminate into an autoclave or by pressing the laminate, the laminate is press-bonded at about 120° C. to 150° C. and under a pressure of 1 MPa to 1.5 MPa. In this way, laminated glass can be obtained.

The laminated glass can be used for automobiles, railway vehicles, aircraft, ships, buildings, and the like. It is preferred that the laminated glass be laminated glass for buildings or for vehicles and it is more preferred that the laminated glass be laminated glass for vehicles. The laminated glass can also be used for applications other than these applications. The laminated glass can be used for a windshield, side glass, rear glass, or roof glass of an automobile, and the like. Since the laminated glass is high in heat shielding properties and is high in visible light transmittance, the laminated glass is suitably used for automobiles.

The laminated glass is a kind of laminated glass serving as a head-up display (HUD). In the laminated glass, measured information such as the speed which is sent from a control unit and the like can be projected onto the windshield from a display unit of the instrumental panel. Accordingly, without making a driver of an automobile move his or her visual field downward, a front visual field and measured information can be visually recognized simultaneously.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

Example 1

Preparation of Composition for Forming First Layer:
The following ingredients were mixed, and kneaded sufficiently with a mixing roll to obtain a composition for forming a first layer.

Polyvinyl acetal resin (average polymerization degree: 1700, content of hydroxyl group: 30.5% by mole, acetylation degree: 1.0% by mole, acetalization degree: 68.5% by mole): 100 parts by weight Triethylene glycol di-2-ethylhexanoate (3GO): 40 parts by weight An amount that is to be 0.2% by weight in the obtained interlayer film of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained interlayer film of BHT (2,6-di-t-butyl-p-cresol)

Preparation of Interlayer Film:
The composition for forming a first layer was co-extruded by using an extruder. At this time, the temperature of the lip die was adjusted within the range of 100° C. to 280° C. so that a temperature gradient was provided while taking the end part having a smaller thickness of the entire interlayer film in the width direction as a low temperature side, and the end part having a larger thickness of the entire interlayer film as a high temperature side. The gap of the lip was adjusted within the range of 1.0 mm to 4.0 mm. The difference in speed of rolls through which the resin film discharged from the lip die passes up to winding was set to be 15% or less. The roll through which the resin discharged from the lip die first passes was installed below the die and previous to the die in the machine direction, the extruding amount from the extruder was adjusted to 700 kg/h, and the speed of the roll through which the resin film first passes was adjusted to 7 m/minute. In this manner, a wedge-like shaped interlayer film having only the first layer was prepared.

The obtained interlayer film has a minimum thickness at one end and has a maximum thickness at the other end. A distance X between one end and the other end was 105 cm.

In Example 1, an interlayer film having a portion where the increment of the thickness decreases from one end side to the other end side in a region where the thickness increases, and having a portion where the wedge angle decreases from one end side to the other end side in a region where the sectional shape in the thickness direction is a wedge-like shape was prepared (see FIG. 5 for the contour shape). In the interlayer film, when the distance between one end and the other end is referred to as X, the peak of the projecting portion was located at 0.6X from the one end. The wedge angle θ of the interlayer film as a whole was 0.51 mrad.

Example 2

An interlayer film was prepared in the same manner as that in Example 1 except that the temperature gradient of the lip die was gentled (see FIG. 5 for the contour shape). The wedge angle θ of the interlayer film as a whole was 0.30 mrad.

Example 3

An interlayer film was prepared in the same manner as that in Example 1 except that the temperature gradient of the lip die was steepened (see FIG. 3 for the contour shape). The wedge angle θ of the interlayer film as a whole was 0.70 mrad.

Comparative Example 1

An interlayer film was prepared in the same manner as that in Example 1 except that the adjusting range of the gap of the lip was changed (see FIG. 1 for the contour shape). The wedge angle θ of the interlayer film as a whole was 0.51 mrad.

Comparative Example 2

An interlayer film was prepared in the same manner as that in Example 1 except that the temperature gradient of the lip die was gentled, and the adjusting range of the gap of the lip was changed (see FIG. 3 for the contour shape). The wedge angle θ of the interlayer film as a whole was 0.29 mrad.

Comparative Example 3

An interlayer film was prepared in the same manner as that in Example 1 except that the temperature gradient of the lip die was steepened, and the adjusting range of the gap of the lip was changed (see FIG. 3 for the contour shape). The wedge angle θ of the interlayer film as a whole was 0.75 mrad.

Example 4

In Example 4, an interlayer film having a portion where the increment of the thickness decreases from one end side to the other end side in a region where the thickness increases, and having a portion where the wedge angle increases from one end side to the other end side in a region where the sectional shape in the thickness direction is a wedge-like shape was prepared (see FIG. 3 for the contour shape).

Preparation of Composition for Forming First Layer:

The following ingredients were mixed, and kneaded sufficiently with a mixing roll to obtain a composition for forming a first layer.

Polyvinyl acetal resin (content of hydroxyl group: 22% by mole, acetylation degree: 13% by mole, acetalization degree: 65% by mole): 100 parts by weight Triethylene glycol di-2-ethylhexanoate (3GO): 65 parts by weight An amount that is to be 0.2% by weight in the obtained first layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained first layer of BHT (2,6-di-t-butyl-p-cresol)

Preparation of Composition for Forming Second Layer and Third Layer:

The following ingredients were mixed, and kneaded sufficiently with a mixing roll to obtain a composition for forming a second layer and a third layer. Other ingredients were added to the polyvinyl acetal resin.

Polyvinyl acetal resin (content of hydroxyl group: 30.5% by mole, acetylation degree: 1% by mole, acetalization degree: 68.5% by mole): 100 parts by weight Triethylene glycol di-2-ethylhexanoate (3GO): 38 parts by weight An amount that is to be 0.2% by weight in the obtained second layer and third layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained second layer and third layer of BHT (2,6-di-t-butyl-p-cresol)

Preparation of Interlayer Film:

The composition for forming the first layer, and the composition for forming the second layer and the third layer were coextruded by using a co-extruder. At this time, the temperature of the lip die was adjusted within the range of 100° C. to 280° C. so that a temperature gradient was provided while taking the end part having a smaller thickness of the entire interlayer film in the width direction as a low temperature side, and the end part having a larger thickness of the entire interlayer film as a high temperature side. The gap of the lip was adjusted within the range of 1.0 mm to 4.0 mm so that the difference in speed of rolls through which the resin film discharged from the lip die passes up to winding was 15% or less. The roll through which the resin film discharged from the lip die first passes was installed below the die and previous to the die in the machine direction. The extruding amount from the extruder was 700 kg/h. The speed of the roll through which the resin film first passes was adjusted to 7 m/minute. In Example 4, after extrusion molding of the interlayer film, the interlayer film was heated and retained at 100° C. to 150° C. for 5 minutes or less, and then returned to the normal temperature. A wedge-like shaped interlayer film having a multilayer structure of the second layer/the first layer/the third layer was prepared. The interlayer film obtained in each of Example 4, later-described Examples 5, 6 and Comparative Examples 4 to 6 has a minimum thickness at one end and has a maximum thickness at the other end. In the interlayer film, when the distance between one end and the other end is referred to as X, the deepest part of the recess portion was located at a position of 0.6× from the one end. The wedge angle θ of the interlayer film as a whole was 0.50 mrad.

Example 5

An interlayer film was prepared in the same manner as that in Example 4 except that the temperature gradient of the lip die was gentled (see FIG. 1). The wedge angle θ of the interlayer film as a whole was 0.30 mrad.

Example 6

An interlayer film was prepared in the same manner as that in Example 4 except that the temperature gradient of the lip die was steepened (see FIG. 5). The wedge angle θ of the interlayer film as a whole was 0.64 mrad.

Comparative Example 4

An interlayer film was prepared in the same manner as that in Example 4 except that the adjusting range of the gap of the lip was changed (see FIG. 3). The wedge angle θ of the interlayer film as a whole was 0.58 mrad.

Comparative Example 5

An interlayer film was prepared in the same manner as that in Example 4 except that the temperature gradient of the lip die was gentled, and the adjusting range of the gap of the lip was changed (see FIG. 3). The wedge angle θ of the interlayer film as a whole was 0.29 mrad.

Comparative Example 6

An interlayer film was prepared in the same manner as that in Example 4 except that the temperature gradient of the lip die was steepened, and the adjusting range of the gap of the lip was changed (see FIG. 5). The wedge angle θ of the interlayer film as a whole was 0.36 mrad.

Example 7

In Example 7, an interlayer film having a portion where the increment of the thickness decreases from one end side to the other end side in a region where the thickness increases, and having a portion where the wedge angle increases from one end side to the other end side in a region where the sectional shape of the thickness direction is a wedge-like shape was prepared. (see FIG. 5 for the contour shape).

Preparation of Composition for Forming First Layer:

The following ingredients were mixed, and kneaded sufficiently with a mixing roll to obtain a composition for forming a first layer.

Polyvinyl acetal resin (content of hydroxyl group: 22% by mole, acetylation degree: 13% by mole, acetalization degree: 65% by mole): 100 parts by weight Triethylene glycol di-2-ethylhexanoate (3GO): 65 parts by weight Tinuvin 326 (2-(2'-hydroxy-3'-t-butyl-5-methylphenyl)-5-chlorobenzotriazole, "Tinuvin 326" available from BASF Japan Ltd.) 0.2 parts by weight BHT (2,6-di-t-butyl-p-cresol) 0.2 parts by weight Preparation of Composition for Forming Second Layer and Third Layer:

The following ingredients were mixed, and kneaded sufficiently with a mixing roll to obtain a composition for forming a second layer and a third layer. Other ingredients were added to the polyvinyl acetal resin.

Polyvinyl acetal resin (content of hydroxyl group: 30.5% by mole, acetylation degree: 1% by mole, acetalization degree: 68.5% by mole): 100 parts by weight Triethylene glycol di-2-ethylhexanoate (3GO): 38 parts by weight Tinuvin 326 (2-(2'-hydroxy-3'-t-butyl-5-methylphenyl)-5-chlorobenzotriazole, "Tinuvin 326" available from BASF Japan Ltd.) 0.2 parts by weight BHT (2,6-di-t-butyl-p-cresol) 0.2 parts by weight Preparation of Interlayer Film:

The composition for forming the first layer, and the composition for forming the second layer and the third layer were coextruded by using a co-extruder. At this time, the temperature of the lip die was adjusted within the range of 100° C. to 280° C. so that a temperature gradient was provided while taking the end part having a smaller thickness of the entire interlayer film in the width direction as a low temperature side, and the end part having a larger thickness of the entire interlayer film as a high temperature side. The gap of the lip was adjusted within the range of 1.0 mm to 4.0 mm so that the difference in speed of rolls through which the resin film discharged from the lip die passes up to winding was 15% or less. The roll through which the resin film discharged from the lip die first passes was installed below the die and previous to the die in the machine direction. The extruding amount from the extruder was 700 kg/h. The speed of the roll through which the resin film first passes was adjusted to 7 m/minute. In Example 7, after extrusion molding of the interlayer film, the interlayer film was heated and retained at 100° C. to 150° C. for 5 minutes or less, and then returned to the normal temperature. A wedge-like shaped interlayer film having a multilayer structure of the second layer/the first layer/the third layer was prepared. The interlayer film obtained in each of Example 7, later-described Examples 8 to 10 and Comparative Examples 7 to 9 has a minimum thickness at one end and has a maximum thickness at the other end. In the interlayer film, when the distance between one end and the other end is referred to as X, the peak of the projecting portion was located at 0.6X from the one end. The wedge angle θ of the interlayer film as a whole was 0.34 mrad.

Example 8

An interlayer film was prepared in the same manner as that in Example 7 except that the temperature gradient of the lip die was steepened (see FIG. 5). The wedge angle θ of the interlayer film as a whole was 0.54 mrad.

Example 9

An interlayer film was prepared in the same manner as that in Example 7 except that the temperature gradient of the lip die was gentled (see FIG. 5). The wedge angle θ of the interlayer film as a whole was 0.26 mrad.

Example 10

An interlayer film was prepared in the same manner as that in Example 9 except that the temperature gradient of the lip die was steepened, and the adjusting range of the gap of the lip was changed (see FIG. 3). The wedge angle θ of the interlayer film as a whole was 0.45 mrad.

Example 11

An interlayer film was prepared in the same manner as that in Example 10 except that the temperature gradient of the lip die was steepened, and the adjusting range of the gap of the lip was changed (see FIG. 3). The wedge angle θ of the interlayer film as a whole was 0.62 mrad. In the interlayer film, when the distance between one end and the other end is referred to as X, the deepest part of the recess portion was located at a position of 0.6X from the one end.

Comparative Example 7

An interlayer film was prepared in the same manner as that in Example 7 except that the temperature gradient of the lip die was steepened, and the adjusting range of the gap of the lip was changed (see FIG. 5). The wedge angle θ of the interlayer film as a whole was 0.50 mrad.

Comparative Example 8

An interlayer film was prepared in the same manner as that in Example 7 except that the adjusting range of the gap of the lip was changed (see FIG. 5). The wedge angle θ of the interlayer film as a whole was 0.27 mrad.

Comparative Example 9

An interlayer film was prepared in the same manner as that in Example 7 except that the temperature gradient of the lip die was steepened, and the adjusting range of the gap of the lip was changed (see FIG. 5). The wedge angle θ of the interlayer film as a whole was 0.43 mrad.

(Evaluation)
(1) Measurement of Partial Wedge Angle

The region for display in the interlayer films obtained in Examples and Comparative Examples is a region between 10 cm and 59.5 cm from one end of the interlayer film. Therefore, the partial wedge angle $\varphi_x$ and the partial wedge angle $\varphi_y$, the partial wedge angle $A_x$ and the partial wedge angle $A_y$, the partial wedge angle $B_x$ and the partial wedge angle $B_y$, and the partial wedge angle $C_x$ and the partial wedge angle $C_y$, respectively have the same angle.

In the obtained interlayer film, partial wedge angle $\varphi_x$ and partial wedge angle $\varphi_y$ in the region between a position of 10 cm and a position of 59.5 cm from the one end toward the other end of the interlayer film (region R, region for display) were calculated.

In the obtained interlayer film, partial wedge angle $A_x$ and partial wedge angle $A_y$ in the region between a position of 10 cm and a position of 26.5 cm from the one end toward the other end of the interlayer film (first partial region, first partial region for display) were calculated.

In the obtained interlayer film, partial wedge angle $B_x$ and partial wedge angle $B_y$ in the region between a position of 26.5 cm and a position of 43 cm from the one end toward the other end of the interlayer film (second partial region, second partial region for display) were calculated.

In the obtained interlayer film, partial wedge angle $C_x$ and partial wedge angle $C_y$ in the region between a position of 43 cm and a position of 59.5 cm from the one end toward the other end of the interlayer film (third partial region, third partial region for display) were calculated.

In the obtained interlayer film, difference between the maximum value and the minimum value in the partial region Ψ was calculated.

(2) Double Images

A pair of glass plates (clear glass, the size of 510 mm×910 mm, 2.0 mm in thickness) was prepared. An interlayer film with a size corresponding to the size of the glass plate was sandwiched between the pair of glass plates to obtain a laminate. As shown in FIG. 9, the obtained laminate was fitted into a frame of an EPDM-made rubber tube (frame member). The rubber tube has a width of 15 mm. Next, the laminate fitted into a frame of an EPDM-made rubber tube was preliminarily press-bonded by a vacuum bag method. The preliminarily press-bonded laminate was subjected to press-bonding at 150° C. and a pressure of 1.2 MPa with the use of an autoclave to obtain a sheet of laminated glass.

For the obtained laminated glass, double images were evaluated by the following evaluation method.

(2-1) Evaluation of Double Images by Visual Check
(2-1-1) Evaluation of Double Images by Difference in Focal Distance The obtained sheet of laminated glass was installed at a position of the windshield. The information to be displayed, which is emitted from a display unit (focal distance: 2 m, 3 m, and 4 m) installed below the laminated glass, was reflected by the sheet of laminated glass to visually confirm the presence or absence of double images at a prescribed position (the entire region for display). The double images were judged according to the following criteria.

[Criteria for Judgement in Evaluation of Double Images by Visual Check]

oo: Double images are not confirmed.

o: Double images are confirmed very slightly, but are at a level causing no problem in practical use.

x: Not corresponding to the criteria of oo and o.

(2-1-2) Evaluation of Double Images by Observers with Different Seated Heights

The obtained sheet of laminated glass was installed at a position of the windshield. The information to be displayed, which is emitted from a display unit (focal distance: 3 m) installed below the laminated glass, was reflected by the sheet of laminated glass to visually confirm the presence or absence of double images at a prescribed position (the entire region for display). Three observes having seated heights of 85 cm, 90 cm, and 95 cm, respectively judged double images according to the following criteria.

[Criteria for Judgement in Evaluation of Double Images by Visual Check]

oo: Double images are not confirmed by three observers.

o: Double images are confirmed very slightly by one observer, but are at a level causing no problem in practical use.

x: Not corresponding to the criteria of oo and o.

(2-2) Evaluation of Double Images by Device

Double image distance was evaluated by using "double image evaluation device" available from Oxide Corporation. An image projected from the projector (HUD image) was reflected on a laminated glass, and photographed by a camera. From the photographed image, a double image distance was measured. The distance from the projector to the camera (optical length) was 3 m. The reflection angle was the angle obtained by optical path calculation simulation based on the wedge angle of the HUD area.

[Criteria for Judgement in Evaluation of Double Images by Device]

oo: Double image distance is 0 mm or more and less than 1.0 mm.

o: Double image distance is 1.0 mm or more and less than 1.5 mm.

x: Double image distance is 1.5 mm or more and less than 2.0 mm.

The details and the results are shown in the following Tables 1 to 4.

TABLE 1

|  |  | Example 1 | Example 2 | Example 3 | Comparative Example 1 | Comparative Example 2 | Comparative Example 3 |
|---|---|---|---|---|---|---|---|
| Configuration of interlayer film |  | One-layer | One-layer | One-layer | One-layer | One-layer | One-layer |
| Contour shape |  | FIG. 5 | FIG. 5 | FIG. 3 | FIG. 1 | FIG. 3 | FIG. 3 |
| Maximum thickness in interlayer film | μm | 1274 | 1068 | 1468 | 1277 | 1059 | 151.8 |
| Minimum thickness in interlayer film | μm | 760 | 760 | 760 | 760 | 760 | 760 |
| Wedge angle θ of whole interlayer film | mrad | 0.51 | 0.30 | 0.70 | 0.51 | 0.29 | 0.75 |

TABLE 1-continued

|  |  | Example 1 | Example 2 | Example 3 | Comparative Example 1 | Comparative Example 2 | Comparative Example 3 |
|---|---|---|---|---|---|---|---|
| Partial wedge angle $\phi_x$ in region for display | mrad | 0.53 | 0.31 | 0.69 | 0.51 | 0.27 | 0.73 |
| Partial wedge angle $\phi_y$ in region R |  |  |  |  |  |  |  |
| Partial wedge angle $A_x$ in first partial region for display | mrad | 0.55 | 0.35 | 0.72 | 0.58 | 0.34 | 0.67 |
| Partial wedge angle $A_y$ in first partial region |  |  |  |  |  |  |  |
| Partial wedge angle $B_x$ in second partial region for display | mrad | 0.53 | 0.30 | 0.70 | 0.45 | 0.24 | 0.77 |
| Partial wedge angle $B_y$ in second partial region |  |  |  |  |  |  |  |
| Partial wedge angle $C_x$ in third partial region for display | mrad | 0.50 | 0.28 | 0.65 | 0.56 | 0.26 | 0.71 |
| Partial wedge angle $C_y$ in third partial region |  |  |  |  |  |  |  |
| Difference between maximum value and minimum value of partial region $\psi$ | mrad | 0.15 | 0.11 | 0.12 | 0.14 | 0.10 | 0.13 |
| $|A_x - \phi_x|$ and $|A_y - \phi_y|$ | mrad | 0.02 | 0.04 | 0.03 | 0.07 | 0.07 | 0.06 |
| $|B_x - \phi_x|$ and $|B_y - \phi_y|$ | mrad | 0.00 | 0.01 | 0.01 | 0.06 | 0.03 | 0.04 |
| $|C_x - \phi_x|$ and $|C_y - \phi_y|$ | mrad | 0.03 | 0.03 | 0.04 | 0.05 | 0.01 | 0.02 |
| Double images | Visual check | Double image (focal distance: 2 m) | ⊚ | ○ | ○ | ○ | ○ | ○ |
|  |  | Double image (focal distance: 3 m) | ⊚ | ○ | ○ | x | x | x |
|  |  | Double image (focal distance: 4 m) | ⊚ | ○ | ○ | x | x | x |
|  |  | Double image (observers with different seated heights) | ⊚ | ⊚ | ⊚ | x | x | x |
|  | Device | Double image (focal distance: 3 m) | ⊚ | ○ | ○ | x | x | x |

TABLE 2

|  |  | Example 4 | Example 5 | Example 6 | Comparative Example 4 | Comparative Example 5 | Comparative Example 6 |
|---|---|---|---|---|---|---|---|
| Configuration of interlayer film |  | Three-layer | Three-layer | Three-layer | Three-layer | Three-layer | Three-layer |
| Contour shape |  | FIG. 3 | FIG. 1 | FIG. 5 | FIG. 3 | FIG. 3 | FIG. 5 |
| Maximum thickness in interlayer film | μm | 1269 | 1065 | 1472 | 1324 | 1058 | 1066 |
| Minimum thickness in interlayer film | μm | 760 | 760 | 760 | 760 | 760 | 760 |
| Wedge angle θ of whole interlayer film | mrad | 0.50 | 0.30 | 0.64 | 0.58 | 0.29 | 0.36 |
| Partial wedge angle $\phi_x$ in region for display | mrad | 0.50 | 0.30 | 0.71 | 0.55 | 0.28 | 0.66 |
| Partial wedge angle $\phi_y$ in region R |  |  |  |  |  |  |  |
| Partial wedge angle $A_x$ in first partial region for display | mrad | 0.51 | 0.30 | 0.73 | 0.49 | 0.22 | 0.62 |
| Partial wedge angle $A_y$ in first partial region |  |  |  |  |  |  |  |
| Partial wedge angle $B_x$ in second partial region for display | mrad | 0.50 | 0.30 | 0.72 | 0.56 | 0.28 | 0.66 |
| Partial wedge angle $B_y$ in second partial region |  |  |  |  |  |  |  |
| Partial wedge angle $C_x$ in third partial region for display | mrad | 0.50 | 0.30 | 0.66 | 0.58 | 0.33 | 0.72 |
| Partial wedge angle $C_y$ in third partial region |  |  |  |  |  |  |  |
| Difference between maximum value and minimum value of partial region $\psi$ | mrad | 0.13 | 0.12 | 0.14 | 0.14 | 0.13 | 0.11 |
| $|A_x - \phi_x|$ and $|A_y - \phi_y|$ | mrad | 0.01 | 0.00 | 0.02 | 0.06 | 0.06 | 0.04 |
| $|B_x - \phi_x|$ and $|B_y - \phi_y|$ | mrad | 0.00 | 0.00 | 0.01 | 0.01 | 0.00 | 0.00 |
| $|C_x - \phi_x|$ and $|C_y - \phi_y|$ | mrad | 0.00 | 0.00 | 0.05 | 0.03 | 0.05 | 0.06 |
| Double images | Visual check | Double image (focal distance: 2 m) | ⊚ | ⊚ | ○ | ○ | ○ | ○ |
|  |  | Double image (focal distance: 3 m) | ⊚ | ⊚ | ○ | x | x | x |
|  |  | Double image (focal distance: 4 m) | ⊚ | ⊚ | ○ | x | x | x |
|  |  | Double image (observers with different seated heights) | ⊚ | ⊚ | ⊚ | x | x | x |
|  | Device | Double image (focal distance: 3 m) | ⊚ | ⊚ | ○ | x | x | x |

TABLE 3

|  |  | Example 7 | Example 8 | Example 9 | Example 10 | Example 11 |
|---|---|---|---|---|---|---|
| Configuration of interlayer film |  | Three-layer | Three-layer | Three-layer | Three-layer | Three-layer |
| Contour shape |  | FIG. 5 | FIG. 5 | FIG. 5 | FIG. 3 | FIG. 3 |
| Maximum thickness in interlayer film | μm | 1077 | 1257 | 1004 | 1183 | 1349 |
| Minimum thickness in interlayer film | μm | 760 | 760 | 760 | 760 | 760 |
| Wedge angle θ of whole interlayer film | mrad | 0.34 | 0.54 | 0.26 | 0.45 | 0.62 |
| Partial wedge angle $\phi_x$ in region for display | mrad | 0.42 | 0.65 | 0.32 | 0.44 | 0.60 |
| Partial wedge angle $\phi_y$ in region R |  |  |  |  |  |  |

TABLE 3-continued

|  |  | Example 7 | Example 8 | Example 9 | Example 10 | Example 11 |
|---|---|---|---|---|---|---|
| Partial wedge angle $A_x$ in first partial region for display | mrad | 0.45 | 0.68 | 0.34 | 0.43 | 0.58 |
| Partial wedge angle $A_y$ in first partial region |  |  |  |  |  |  |
| Partial wedge angle $B_x$ in second partial region for display | mrad | 0.41 | 0.65 | 0.32 | 0.46 | 0.60 |
| Partial wedge angle $B_y$ in second partial region |  |  |  |  |  |  |
| Partial wedge angle $C_x$ in third partial region for display | mrad | 0.39 | 0.62 | 0.30 | 0.40 | 0.61 |
| Partial wedge angle $C_y$ in third partial region |  |  |  |  |  |  |
| Difference between maximum value and minimum value of partial region $\psi$ | mrad | 0.11 | 0.13 | 0.10 | 0.14 | 0.13 |
| $|A_x - \phi_x|$ and $|A_y - \phi_y|$ | mrad | 0.03 | 0.03 | 0.02 | 0.01 | 0.02 |
| $|B_x - \phi_x|$ and $|B_y - \phi_y|$ | mrad | 0.01 | 0.00 | 0.00 | 0.02 | 0.00 |
| $|C_x - \phi_x|$ and $|C_y - \phi_y|$ | mrad | 0.03 | 0.03 | 0.02 | 0.04 | 0.01 |
| Double images | Visual check | Double image (focal distance: 2 m) | ⊚ | ⊚ | ⊚ | ○ | ○ |
|  |  | Double image (focal distance: 3 m) | ⊚ | ⊚ | ⊚ | ○ | ○ |
|  |  | Double image (focal distance: 4 m) | ⊚ | ⊚ | ⊚ | ○ | ○ |
|  |  | Double image (observers with different seated heights) | ⊚ | ⊚ | ⊚ | ○ | ○ |
|  | Device | Double image (focal distance: 3 m) | ⊚ | ⊚ | ○ | ○ | ○ |

TABLE 4

|  |  | Comparative Example 7 | Comparative Example 8 | Comparative Example 9 |
|---|---|---|---|---|
| Configuration of interlayer film |  | Three-layer | Three-layer | Three-layer |
| Contour shape |  | FIG. 5 | FIG. 5 | FIG. 5 |
| Maximum thickness in interlayer film | μm | 1226 | 1012 | 1156 |
| Minimum thickness in interlayer film | μm | 760 | 760 | 760 |
| Wedge angle θ of whole interlayer film | mrad | 0.50 | 0.27 | 0.43 |
| Partial wedge angle $\phi_x$ in region for display | mrad | 0.62 | 0.33 | 0.53 |
| Partial wedge angle $\phi_y$ in region R |  |  |  |  |
| Partial wedge angle $A_x$ in first partial region for display | mrad | 0.55 | 0.30 | 0.47 |
| Partial wedge angle $A_y$ in first partial region |  |  |  |  |
| Partial wedge angle $B_x$ in second partial region for display | mrad | 0.64 | 0.32 | 0.53 |
| Partial wedge angle $B_y$ in second partial region |  |  |  |  |
| Partial wedge angle $C_x$ in third partial region for display | mrad | 0.67 | 0.39 | 0.58 |
| Partial wedge angle $C_y$ in third partial region |  |  |  |  |
| Difference between maximum value and minimum value of partial region $\psi$ | mrad | 0.12 | 0.10 | 0.13 |
| $|A_x - \phi_x|$ and $|A_y - \phi_y|$ | mrad | 0.07 | 0.03 | 0.06 |
| $|B_x - \phi_x|$ and $|B_y - \phi_y|$ | mrad | 0.02 | 0.01 | 0.00 |
| $|C_x - \phi_x|$ and $|C_y - \phi_y|$ | mrad | 0.05 | 0.06 | 0.05 |
| Double images | Visual check | Double image (focal distance: 2 m) | ○ | ○ | ○ |
|  |  | Double image (focal distance: 3 m) | x | x | x |
|  |  | Double image (focal distance: 4 m) | x | x | x |
|  |  | Double image (observers with different seated heights.) | x | x | x |
|  | Device | Double image (focal distance: 3 m) | x | x | x |

FIG. 10 is a figure showing the relationship between the distance from the one end of the interlayer film and the deviated thickness. In FIG. 10, the curve P represents the relationship between the distance from the one end of the interlayer film that is involved in the present invention and the deviated thickness. In FIG. 10, the curve Q represents the relationship between the distance from the one end of the interlayer film that is not involved in the present invention and the deviated thickness. The deviated thickness means the difference between the desired thickness of the interlayer film and the thickness of the interlayer film that is actually measured.

EXPLANATION OF SYMBOLS 1, 1A, 1B, 1C, 1D, 1E: First layer
1Aa, 1Ca, 1Ea: Portion having sectional shape in thickness direction of rectangular shape
1Ab, 1Cb, 1Eb: Portion having sectional shape in thickness direction of wedge-like shape
2, 2B, 2D: Second layer
3, 3B, 3D: Third layer
11, 11A, 11B, 11C, 11D, 11E: Interlayer film
11a: One end
11b: Other end
11Aa, 11Ca, 11Ea: Portion having sectional shape in thickness direction of rectangular shape
11Ab, 11Cb, 11Eb: Portion having sectional shape in thickness direction of wedge-like shape
21: Laminated glass
22: First lamination glass member
23: Second lamination glass member
R1: Region for display
R2: Surrounding region
R3: Shading region
R11: First partial region for display R12: Second partial region for display
R13: Third partial region for display
51: Roll body
61: Winding core

The invention claimed is:

1. An interlayer film for laminated glass for use in a laminated glass that is a head-up display,
the interlayer film having one end, and the other end being at the opposite side of the one end,
the other end having a thickness larger than a thickness of the one end,
the interlayer film having a region for display corresponding to a display region of the head-up display,
when three regions obtained by equally dividing the region for display into three in a direction connecting the one end and the other end are named a first partial region for display, a second partial region for display, and a third partial region for display in sequence from the one end side,
an absolute value of difference between partial wedge angle $A_x$ in the first partial region for display, and partial wedge angle $\varphi_x$ in the region for display being more than 0 mrad and 0.05 mrad or less,
an absolute value of difference between partial wedge angle $B_x$ in the second partial region for display and partial wedge angle $\varphi_x$ in the region for display being 0.05 mrad or less,
an absolute value of difference between partial wedge angle $C_x$ in the third partial region for display and partial wedge angle $\varphi_x$ in the region for display being more than 0 mrad and 0.05 mrad or less, and
the partial wedge angle $A_x$ being the largest among the three partial wedge angles of the partial wedge angle $A_x$, the partial wedge angle $B_x$, and the partial wedge angle $C_x$.

2. The interlayer film for laminated glass according to claim 1, wherein the interlayer film as a whole has a wedge angle $\theta$ of 0.05 mrad or more.

3. The interlayer film for laminated glass according to claim 1, containing a thermoplastic resin.

4. The interlayer film for laminated glass according to claim 1, containing a plasticizer.

5. The interlayer film for laminated glass according to claim 1, comprising:
a first layer; and
a second layer arranged on a first surface side of the first layer.

6. The interlayer film for laminated glass according to claim 5, wherein
the first layer contains a polyvinyl acetal resin,
the second layer contains a polyvinyl acetal resin, and
a content of a hydroxyl group of the polyvinyl acetal resin in the first layer is lower than a content of a hydroxyl group of the polyvinyl acetal resin in the second layer.

7. The interlayer film for laminated glass according to claim 5, wherein
the first layer contains a polyvinyl acetal resin,
the second layer contains a polyvinyl acetal resin,
the first layer contains a plasticizer,
the second layer contains a plasticizer, and
a content of the plasticizer in the first layer relative to 100 parts by weight of the polyvinyl acetal resin in the first layer is larger than a content of the plasticizer in the second layer relative to 100 parts by weight of the polyvinyl acetal resin in the second layer.

8. The interlayer film for laminated glass according to claim 1, wherein the partial wedge angle $C_x$ is the smallest among the three partial wedge angles of the partial wedge angle $A_x$, the partial wedge angle $B_x$, and the partial wedge angle $C_x$.

9. The interlayer film for laminated glass according to claim 1, wherein the partial wedge angle $A_x$ is larger than the partial wedge angle $\varphi_x$, and the partial wedge angle $C_x$ is smaller than the partial wedge angle $\varphi_x$.

10. The interlayer film for laminated glass according to claim 5, further comprising:
a third layer arranged on a second surface side opposite to the first surface of the first layer.

11. The interlayer film for laminated glass according to claim 1, wherein the interlayer film as a whole has a wedge angle $\theta$ of 0.54 mrad or less.

* * * * *